United States Patent
Lugash et al.

(10) Patent No.: US 8,798,871 B2
(45) Date of Patent: Aug. 5, 2014

(54) LIFTGATE CONTROLLER

(75) Inventors: Casey Lugash, Santa Fe Springs, CA (US); Paul Bark, Canyon Lake, CA (US)

(73) Assignee: RS Drawings, LLC, Santa Fe Springs, CA (US)

( * ) Notice: Subject to any disclaimer, the term of this patent is extended or adjusted under 35 U.S.C. 154(b) by 916 days.

(21) Appl. No.: 12/406,447

(22) Filed: Mar. 18, 2009

(65) Prior Publication Data

US 2009/0240402 A1 Sep. 24, 2009

Related U.S. Application Data

(60) Provisional application No. 61/038,665, filed on Mar. 21, 2008.

(51) Int. Cl.
| | |
|---|---|
| *B60R 22/00* | (2006.01) |
| *E05F 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G01M 17/00* | (2006.01) |
| *G06F 11/30* | (2006.01) |
| *G06F 19/00* | (2011.01) |
| *G07C 5/00* | (2006.01) |

(52) U.S. Cl.
USPC .......................... 701/49; 701/29.1; 701/34.4

(58) Field of Classification Search
USPC .............. 701/49, 29.1, 31.4, 33.4, 34.4, 29.2
See application file for complete search history.

(56) References Cited

U.S. PATENT DOCUMENTS

| | | | |
|---|---|---|---|
| 6,249,727 B1 | 6/2001 | Muller | |
| 6,510,350 B1 * | 1/2003 | Steen et al. | 700/9 |
| 6,803,854 B1 * | 10/2004 | Adams et al. | 340/531 |
| 6,840,445 B2 | 1/2005 | Gatz | |
| 7,062,362 B2 * | 6/2006 | Obradovich et al. | 701/1 |

(Continued)

FOREIGN PATENT DOCUMENTS

| | | |
|---|---|---|
| DE | 19644076 A1 | 5/1998 |
| JP | 58012844 A1 | 1/1983 |
| WO | WO01/84506 | 11/2001 |

*Primary Examiner* — Khoi Tran
*Assistant Examiner* — Nicholas Kiswanto
(74) *Attorney, Agent, or Firm* — Tutunjian & Bitetto, P.C.

(57) ABSTRACT

A controller for a lift, includes a communication module configured to wirelessly transmit data relating to the personnel operating and operating conditions of a lift to a remotely located station. The remote station wirelessly sends satisfaction or non-satisfaction messages to the lift controller in response to received input data or sensed conditions relating to the operation of the lift. The lift controller includes circuitry for obtaining and/or storing the sensed conditions and received input data, where the communication module then transmits this information to a remote station using a wireless network either public or private depending on the desired application. In accordance with one implementation, the sensed conditions can include a lift state, a motion of the lift, a load applied to the lift, a lift temperature, a hydraulic fluid pressure, a wait time for recharging a hydraulic pump, an operator safety condition and a number of cycles of operation of the lift. The operator safety conditions may include, for example, whether the operator is using both hands for inputting a command into the lift controller, whether the vehicle is properly parked, whether the operator is off a deck of the lift, and whether the operator is clear of a projected motion pay of the lift.

19 Claims, 33 Drawing Sheets

(56) References Cited

U.S. PATENT DOCUMENTS

| | | | |
|---|---|---|---|
| 7,653,384 B2 * | 1/2010 | Yamada | 455/419 |
| 7,725,129 B2 * | 5/2010 | Grunhold | 455/556.1 |
| 7,885,603 B2 * | 2/2011 | Santavicca | 455/41.2 |
| 2002/0074959 A1 | 6/2002 | Van Wiemeersch | |
| 2003/0026103 A1 * | 2/2003 | Reese et al. | 362/486 |
| 2003/0095038 A1 | 5/2003 | Dix | |
| 2004/0200644 A1 | 10/2004 | Paine et al. | |
| 2005/0165513 A1 * | 7/2005 | Obradovich | 701/1 |
| 2005/0195068 A1 * | 9/2005 | Johnson et al. | 340/5.61 |
| 2006/0071501 A1 * | 4/2006 | Ablabutyan et al. | 296/56 |
| 2006/0184456 A1 * | 8/2006 | de Janasz | 705/72 |
| 2007/0224025 A1 | 9/2007 | Ablabutyan et al. | |
| 2009/0045924 A1 * | 2/2009 | Roberts et al. | 340/10.41 |

* cited by examiner

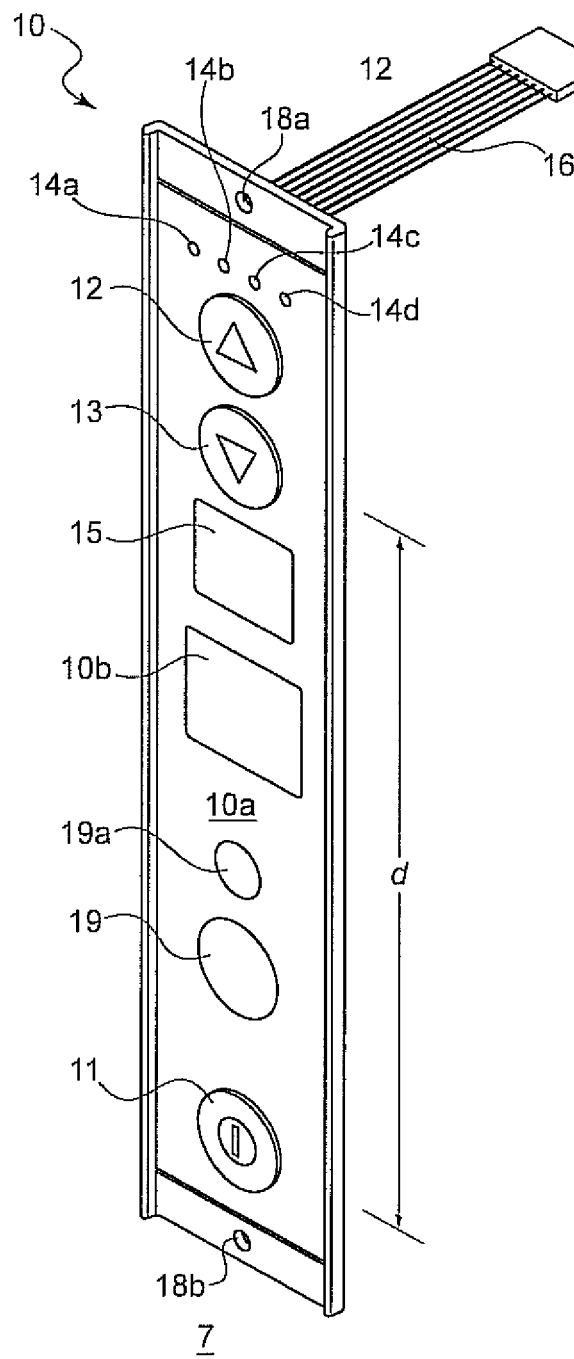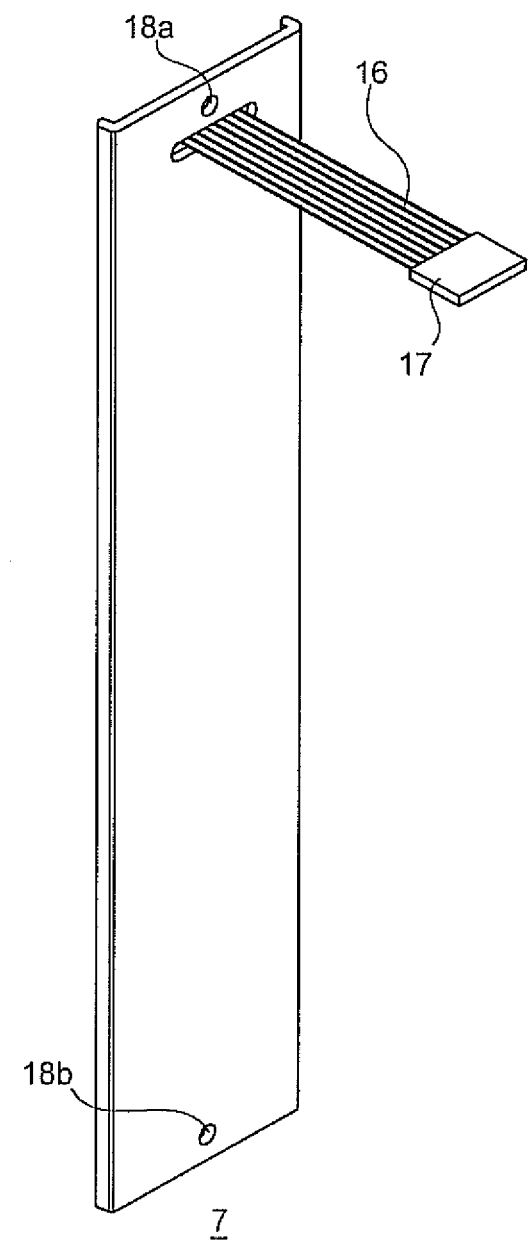
FIG. 2A
FIG. 2B

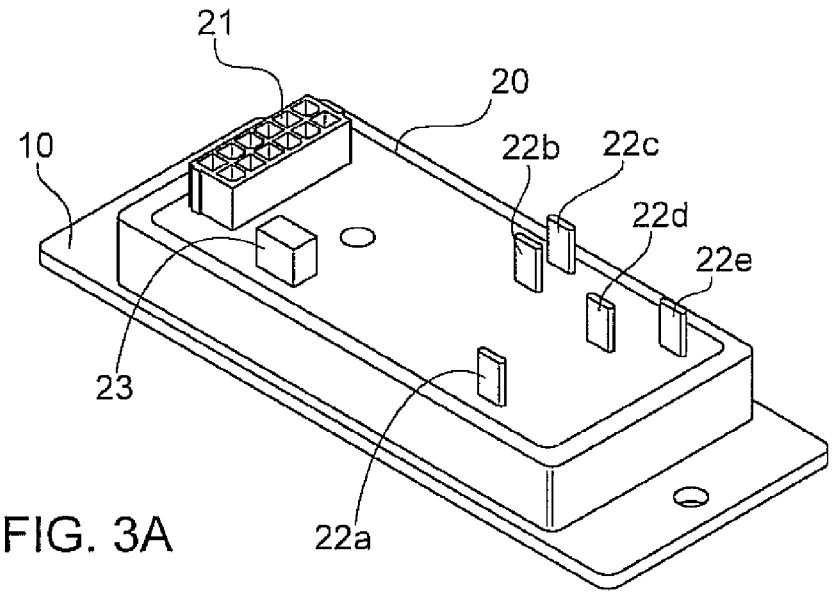
FIG. 3A
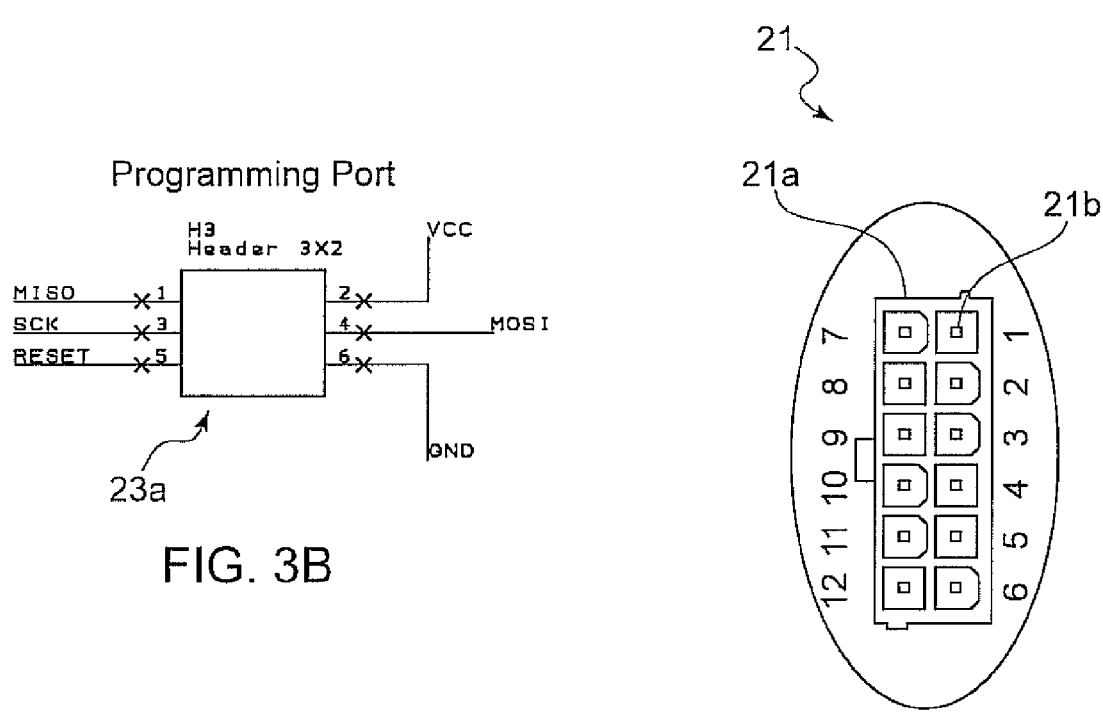
FIG. 3B
FIG. 3C

Surge Protection and Voltage Regulation

Reverse Protection and Current Sensing

| Parameters | Range | Preferred Range | Why measure this? | Analysis performed? | Processed involved? | Embodiment of parameter |
|---|---|---|---|---|---|---|
| On time | Time: | model dependent | 1. life of the components | 1. Normal vs. Abnormal - i.e., bad ground. 2. Lifts at certain amps getting longer over time? Motor wear/ electrical problem. | Record for future comparison | clock |
| On time/Battery/ Amp draw | | model dependent | Are you exceeding battery capacity? How heavy are the loads that are being put on this? How many cycles left with the battery in the state that it is in now? | Recovery time of battery/excessive voltage drop during on time/how heavy list is being used. | Warning. Absolute level shut down | clock/volt meter/ amp meter (in controller) |
| On time/Amps/ Pressure | | model dependent | Is lift being overloaded? protect motor/vehicle/lift | If one of three things out of range of history of lifts: motor burning electrical problem. Possibly overloaded. | Record for warranty purposes. Warning to operator/central. Do lifts match what operator is supposed to be delivering. | clock/volt meter/ (in controller). pressure transducer in hydraulic system |

FIG. 14A

| Parameters | Range | Preferred Range | Why measure this? | Analysis performed? | Processed involved? | Embodiment of parameter |
|---|---|---|---|---|---|---|
| Cycles | 5000 cycles check lift/hoses for chafing. 10,000 check pins | 20,000 to 30,000 for warranty purposes | For maintenance schedules. Warranty purposes. Ability for rental company to charge for excess cycles. To track operators route history. How lift is being used. | Maintenance needed? | Notify at certain intervals that maintenance needed. With data offloaded to a customer database manage route schedule per gate: workloads can be more level loaded between vehicles. Add cycle maintenance information into all manuals. | Limit switch/clock, IE ran 10 secs at least counts as life and/or hits the end of travel (switch) |
| Amp draw | model dependent | | To see if burning up motor. How heavy lift being used. Spike in system can indicate problem (could be jamming). Question a change in amp draw. | Can be used for warranty: determining if heavy user or not. Can you tell if they changed or didn't change the motor (they put on non maxon motor or they put maxor warranty motor on another gate | | Amp meter in controller |
| Amp draw | model dependent | | Low voltage situations. How much drop in system. Prevent damage from High Voltage. Voltage difference between battery vs motor input | Big drop: bad ground or bad battery. Notify too small battery for application | Monitor during lift use to determine battery state/confirmation on how heavy a load does lift have, running within normal parameters. | Amp meter in controller |

FIG. 14B

| Parameters | Range | Preferred Range | Why measure this? | Analysis performed? | Processed involved? | Embodiment of parameter |
|---|---|---|---|---|---|---|
| Folding cycles | | | Measure Length/Pressure/ Time of cycle | 1. Normal vs. Abnormal - i.e., bad ground. 2. Lifts at certain amps getting longer over time? Motor wear/ electrical problem. | Record for future comparison | Clock/indicator in controller IE fold button pushed for 2 secs. |
| State of battery | | | Looking to ensure enough depth of battery to last during lift. Ensure long term voltage situations do not exist | Old battery will cause low voltage situations that can lead to burned out starter solenoids. Harder on system to run on low battery | Warranty maintenance | Volt meter in controller |
| Level sensor | | | To know the angle position of the loading surface. | Is platform tilted too far? If automatic level option present, keep the platform level. | Warn driver unsafe load condition-road/location. Or trip loaded too far out. Warn fleet/Maxon there is an issue (in combo with pressure load is too far out). | |
| GPS | | | What area of country is lift used in? Is it located in icy/snowy conditions? Location. | Icy/snowy could indicate MgCl being used, might need more corrosion protection. Inform for future orders. Sell options. | Warranty effects | |

FIG. 14C

| Parameters | Range | Preferred Range | Why measure this? | Analysis performed? | Processed involved? | Embodiment of parameter |
|---|---|---|---|---|---|---|
| Oil level | | | Ensure proper fluid level still in tank. Low level would indicate leaks. Can send warning to customer. | Compare to correct oil level for this model. | Maintenance | Sensor in the tank |
| Position of platform | | | Safe to travel or not? Where is lift within the process? | Whether they are accessing back of unit (vs. moving-) (position whether moving) vs. what was happening. | To ensure proper operation. Warranty. Warning that platform not stowed while driving. | Mag switches/ sensors |
| Position of lifting arms/ rams | | | Determine if lift is being used. To measure position of arms | Lift cycles | Warning that platform not stowed while driving. | Mag switches/ sensors |
| Impact sensors. | | | How hard did the truck hit the dock? Or how hard is gate hit by something? | Measuring impact force. | Warranty | |
| Interlock to vech. | | | To send signal to driver that the platform and/or walk ramp is not stowed when vehicle is in park | What state vehicle is in vs. what state lift is in | Warranty | |

FIG. 14D

| Parameters | Range | Preferred Range | Why measure this? | Analysis performed? | Processed involved? | Embodiment of parameter |
|---|---|---|---|---|---|---|
| Speed of lift | | | To know how fast the lift is operating. Flow control backwards (after maintenance). | Compare speed to correct speed for model | Use with function at time to know if correct speed present. Temperature dependent. Use with battery voltage. Oil temp | Accelerator sensor/flow meter/ linear actuator on cylinder/velocity sensor. |
| Temp sensors Ambient | | | Need for determining if time to change oil for cold/hot weather | Sense speed/temp | Speed/ | Thermistor/ thermometer |
| Pressure | | | To know psi in hydraulic system | Load/Effort/Jamming spikes | | Pressure sensor |
| Power usage | | | To understand draw on the battery and the efficiency of the lift. | Short reports too much amp with no work being done. Condition of motor. | Number of cycles can determine how equipment is lasting over time. With state of battery can help how many lifts left. | |
| Program/ configuration inputs | | | Which model is this gate. Whether permission is given to use all aspects of a gate. | Remotely confirm gate information to ensure operator using correctly | Remotely accessing more features. Subscription service. Remotely shut down/allow features reconfigure gate. | |
| Key chain or card signal | Within x feet | | To prevent unauthorized operation | Present or not present? | Operation of gate. Who is operating gate. | FOB on driver's person |

FIG. 14E

| Parameters | Range | Preferred Range | Why measure this? | Analysis performed? | Processed involved? | Embodiment of parameter |
|---|---|---|---|---|---|---|
| RF tower | within x feet | | Drive into home base, downloads and uploads information into database | | Maintenance/Warranty | |
| Clock/ calendar | | | Used in timing. Record of when items happened | How long things are taking, etc. | | |
| Serialization | | | Serialize unit to controller | Controller has unit serial number on so data is correlated to unit. | | |
| Cycles, Voltage, Amp | | | To be able to develop history of how customer uses gate | Customer has correct gate for application. Be able to sell correct gate to application. | | |
| Cycles, Amp | | | How many cycles with a heavy load | Customer or maxon has ability to analyze either daily/monthly/by truck/by stop/by fleet | The more of these parameters looked at together the more accurate the analysis | |
| Cycles, Pressure | | | How many cycles with a heavy load | Customer or maxon has ability to analyze either daily/monthly/by truck/by stop/by fleet | Listed separate to show can do as pieces to make sure a competitor doesn't just use partials. | |
| Cycles/ Voltage | | | How many cycles with a heavy load | Customer or maxon has ability to analyze either daily/monthly/by truck/by stop/by fleet | | |

FIG. 14F

| Parameters | Range | Preferred Range | Why measure this? | Analysis performed? | Processed involved? | Embodiment of parameter |
|---|---|---|---|---|---|---|
| Sacrificial corrosion pad | | | To inform customer that more maintenance is needed to keep gates from rusting, running too hot could create problems with motor | | Warranty/Sales tool/ Maintenance | |
| Oil temp Motor temp Dock lock/ Underride damage | | | To ensure correct usage | | | |
| Keypad on gate | | | Key in serial number and it would give part for replacement. Code to use it. Code for maintenance/code for operation | | | |
| Keypad in pump | | | Tech service can put while on call signal back to maxon: rusty/ unauthorized parts | | Warnings/Warranty/Input to/from gate | |
| Fingerprint scan | | | Correct person | | | |
| Coded part (i.e., pump motor) | | | Operating gate ensure correct parts used on gates. Shift if pump/motor bad. Run as alternating pumps or once every | If two sizes of pumps If no load fast Pump/high load slow pump | | |

FIG. 14G

| Parameters | Range | Preferred Range | Why measure this? | Analysis performed? | Processed involved? | Embodiment of parameter |
|---|---|---|---|---|---|---|
| | | | time. Or motor getting too hot, switch to second one. | | | |
| Dual pump | | | Use two pumps in correct situations. | | | |
| Motor brush sensor | | | Inform customer when to replace motor | | | |

FIG. 14H

LIFTGATE CONTROLLER

RELATED APPLICATION INFORMATION

This application claims priority from U.S. Provisional Patent Application Ser. No. 61/038,665 filed on Mar. 21, 2008, the entire contents of which is incorporated herein by reference.

BACKGROUND

1. Field of Technology

The present invention relates generally to controllers, and in particular to wireless control systems for controllers of liftgates or wheelchair lifts.

2. Description of Related Art

Lifts such as liftgates are typically mounted at a structure such as the rear of a vehicle to lift payloads on a platform from one level (e.g., ground level) up to another level (e.g., the bed of the vehicle), or vice versa.

Typically, such liftgates and wheelchair lifts (hereinafter referred to generally as "lifts") employ linkage systems to maintain the lift platform in a horizontal plane through the lifting range. Examples of such lift linkage systems may be parallelogram linkages, runner and/or rail linkages. The lift platform is attached to linkages by pivot members, which allow the lift platform to be placed in a generally vertical position when in the lowered position. When in the vertical position, operation of the lifting mechanism rotates the lift platform into an inverted, stowed position beneath the vehicle body.

Hydraulic actuators and electric actuators may be used to provide lifting force for moving the lift. Because of the complexity in the motion of the lift, a controller is needed to ensure proper operations. Conventional controllers use toggle switches for simple up/down lift control, without monitoring lift motion. In addition, such conventional toggle switches may be inadvertently bumped by the operator, causing unintended motion of the lift. There is, therefore, a need for a method and system for controlling lift gates through a wide range of motion.

SUMMARY

According to one preferred implementation of the present invention, a field subsystem located on a vehicle with a lift gate is in wireless communication with a remotely located station. The field subsystem includes a controller configured to receive operator inputs and/or sensor data received from one or more sensors sensing operating conditions of the lift gate. The remotely located station is capable of wirelessly receiving the operator input and/or sensor data and can diagnose, analyze and process such data for the purpose of providing a satisfaction or non-satisfaction message to the controller of the field subsystem, or for purposes of determining maintenance schedules for the particular lift gate.

In one implementation, the one or more conditions include one or more operational parameters comprising lift states such as one or more sensed lift states including: whether the lift is fully extended, partially extended, or in a completely closed (tucked) position; a motion of the lift; a load applied to the lift; a lift temperature; a wait time for recharging a hydraulic lift pump; a number of cycles of operation of the lift, etc.

According to another implementation, the method for controlling the operation of a lift gate includes sensing at least one condition of the lift, wirelessly transmitting from a lift controller the sensed at least one operating condition to a remote station, and wirelessly transmitting from the remote station to the lift controller a satisfaction or a non-satisfaction indication based on the sensed at least one operating condition.

According to a further implementation, the sensing includes sensing at least one of the following conditions: a lift state; a motion of the lift; a load applied to the lift; a lift temperature; a hydraulic fluid pressure; a wait time for recharging a hydraulic pump; an operator safety condition; and a maintenance condition.

BRIEF DESCRIPTION OF THE DRAWINGS

In the drawings wherein like references denote similar components throughout the views:

FIG. 2A shows a front view of a controller switch panel for a lift control system in accordance with an embodiment of the present invention;

FIG. 2B shows a backside view of the controller switch panel for a lift control system in accordance with an embodiment of the present invention;

FIG. 3A shows a backside view of a controller switch panel together with a connection box in accordance with an embodiment of the invention;

FIG. 3B shows a pin out map of the connection box;

FIG. 3C shows an expanded top view of the connection box;

FIGS. 14A-14H show a table of the various conditions that can be monitored/sensed according to an implementation.

DETAILED DESCRIPTION

The present invention provides a control system implementing a method for controlling a lift by monitoring operational parameters of the lift, wirelessly communicating the monitored parameters to a location remote from the vehicle carrying the liftgate system, and controlling the liftgate system in response to the monitored parameters. In one embodiment, such a control system includes a lift controller comprising a logic circuit configured for monitoring certain operational parameters, such as checking one or more conditions, and for controlling motion of the lift based on the said one or more conditions.

Figure 1A:
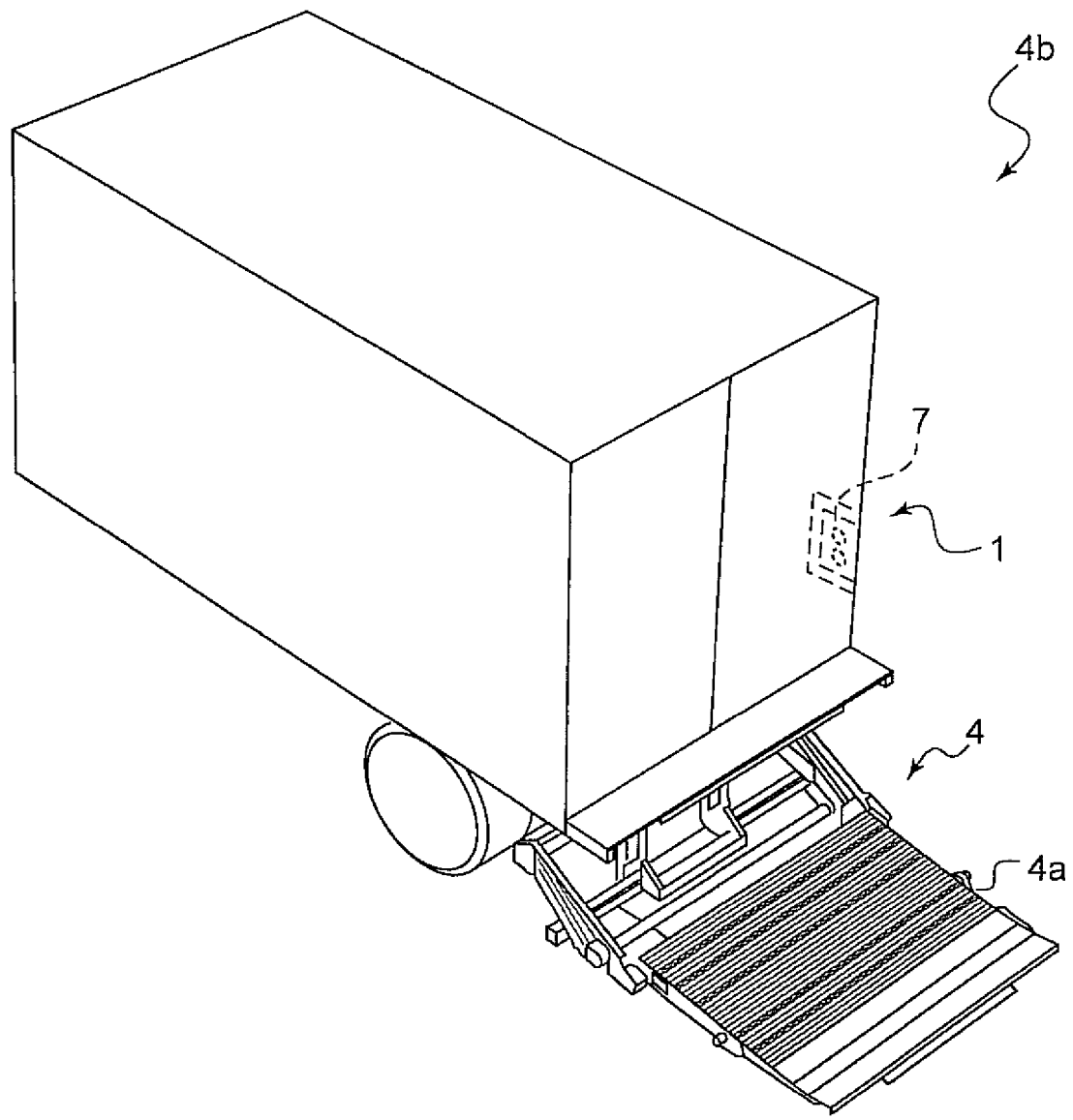
FIG. 1A shows a perspective view of a lift having a platform coupled to a vehicle.
Figure 1B:
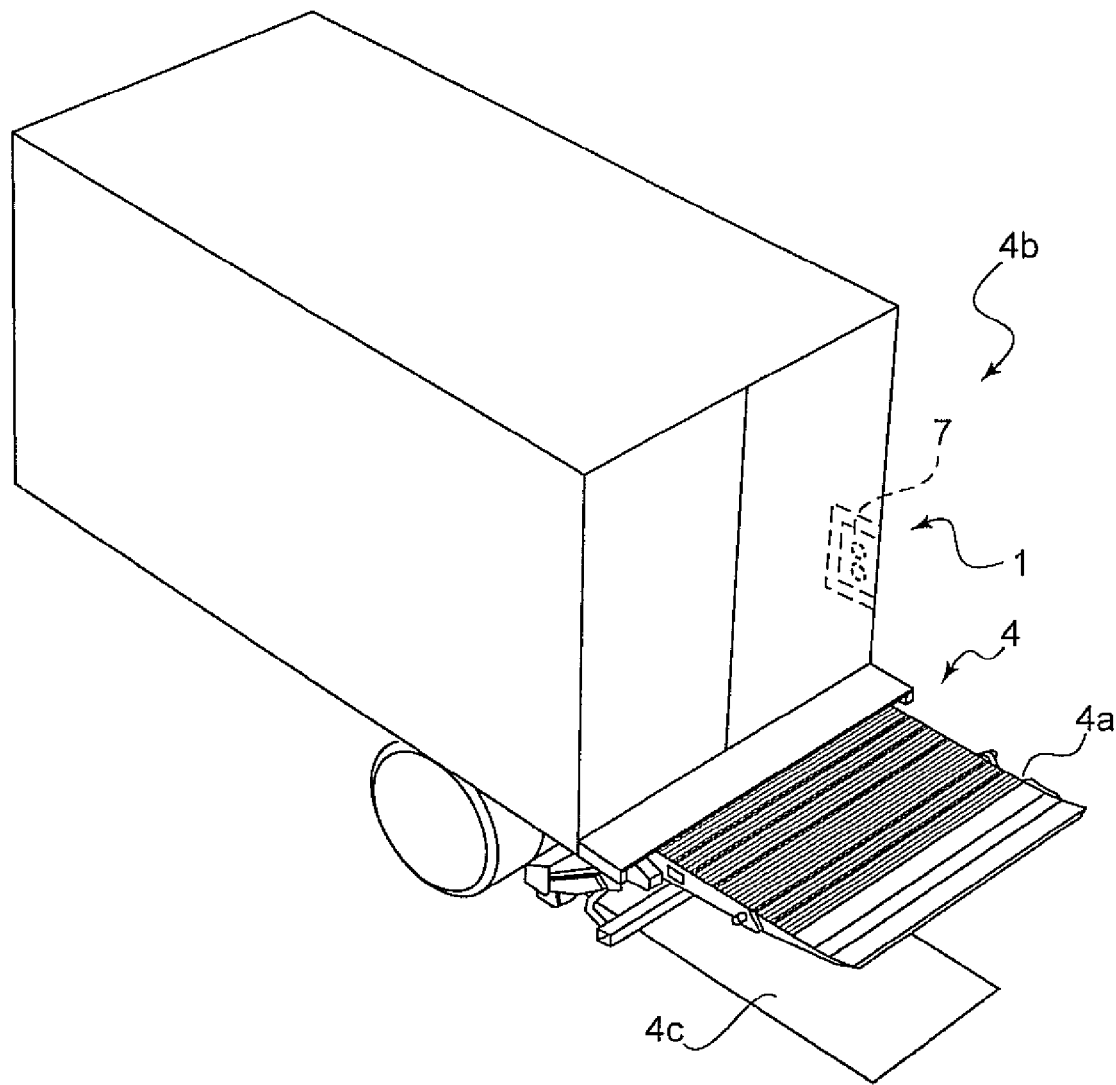
FIG. 1B shows a perspective view of the platform of the lift being lifted up from the ground level, as controlled by an operator using the control panel.
Figure 1C:
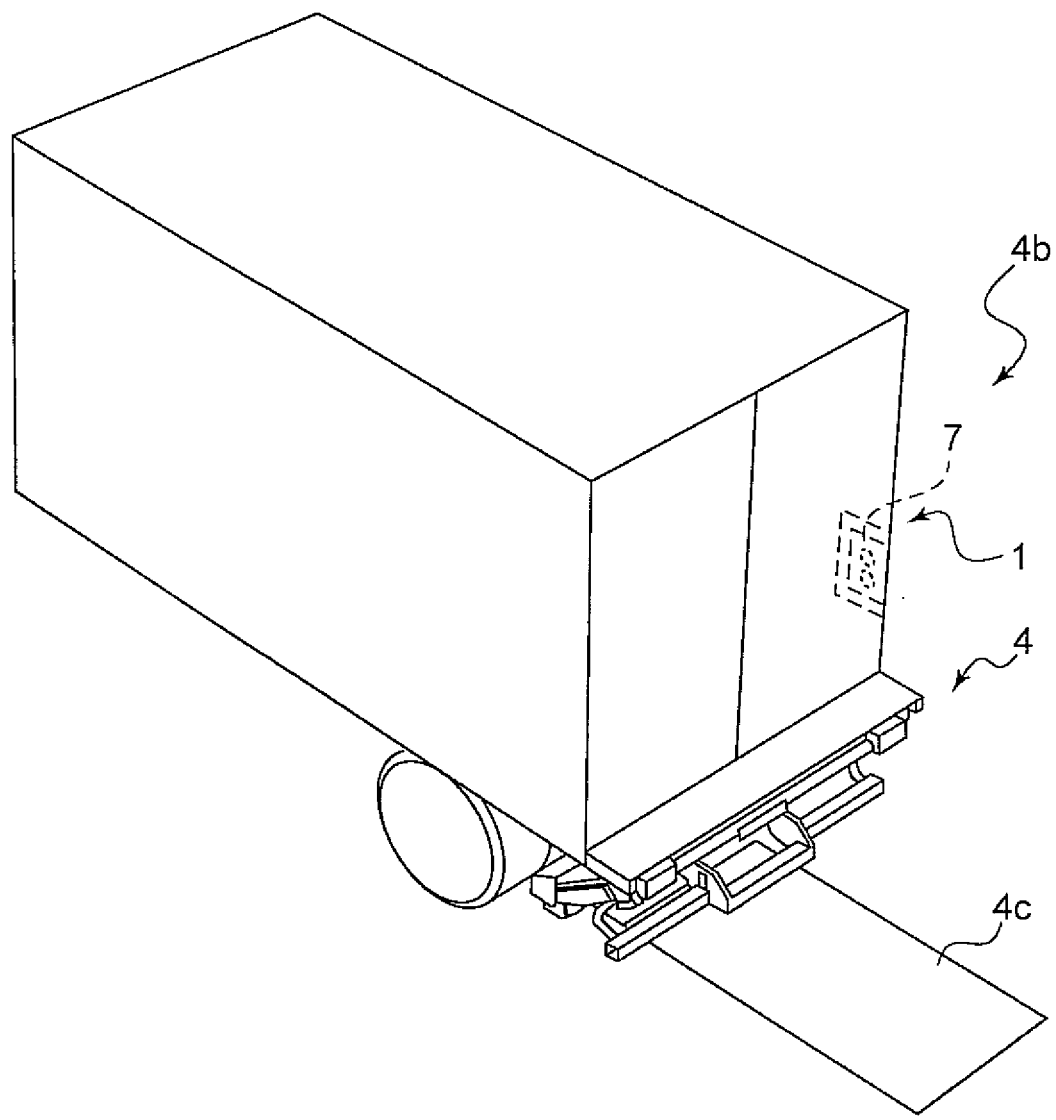
FIG. 1C shows a perspective view of the lift in its stowed position, with the platform hidden beneath the vehicle.

FIG. 1A shows a perspective view of a lift 4 having a platform 4a coupled to a vehicle 4b. The platform 4a as shown is extended and is in its ground position. The motion of the lift 4 is controlled by an operator using a control system 1 through a control panel 7. FIG. 1B shows the platform 4a of the lift 4 in the up position from the ground level 4c, as controlled by input from an operator using the control panel 7. FIG. 1C illustrates the lift 4 in its stowed position, with the platform 4a hidden beneath the vehicle 4b. In the examples of FIGS. 1A-1C, the control system 1 is shown on the right side of the truck for safety purposes (i.e., on the side opposite the street). It is to be understood that the location of control system 1 can be changed without departing from the scope of the present invention.

Figure 1D:
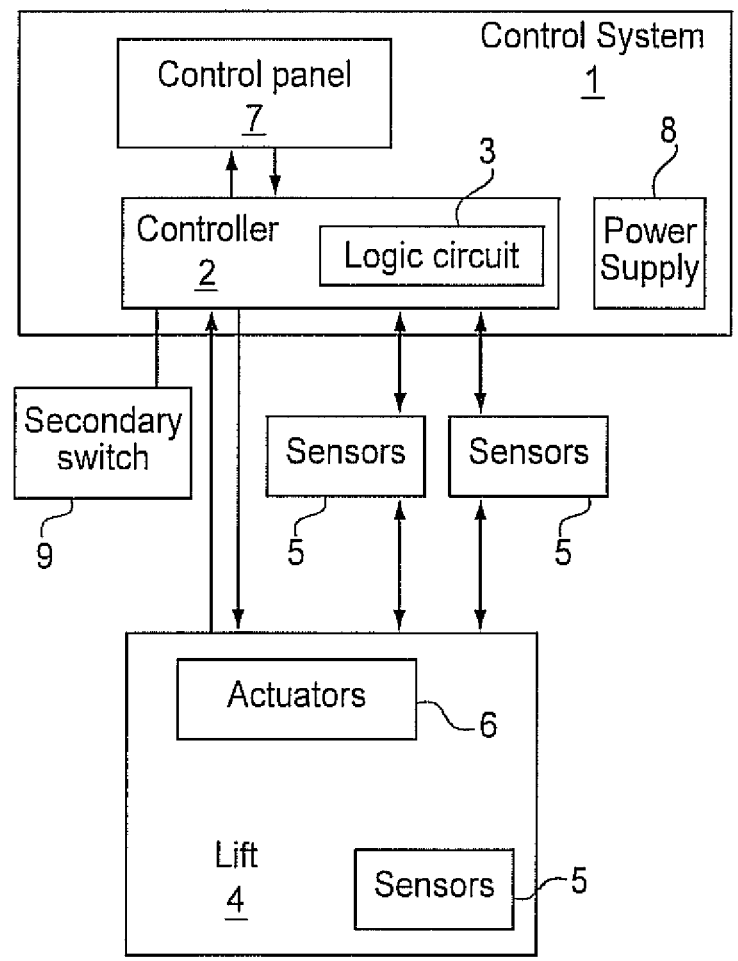
FIG. 1D shows a functional block diagram of an example lift control system implementing a lift control method, according to an embodiment of the present invention.

FIG. 1D shows a functional block diagram of an example control system 1 including a lift controller 2 comprising a logic circuit 3 configured for monitoring certain operational parameters of the lift 4 and/or the controller 2, such as checking one or more conditions via one or more sensors 5, and for controlling operation of the lift 4 based on said operational parameters. The lift actuators 6 move a lift platform (not shown). Although the sensors 5 are described as part of the control system 1, the sensors 5 can be disposed on the lift 4 and/or can be existing sensors on the lift 4.

Figure 1E:
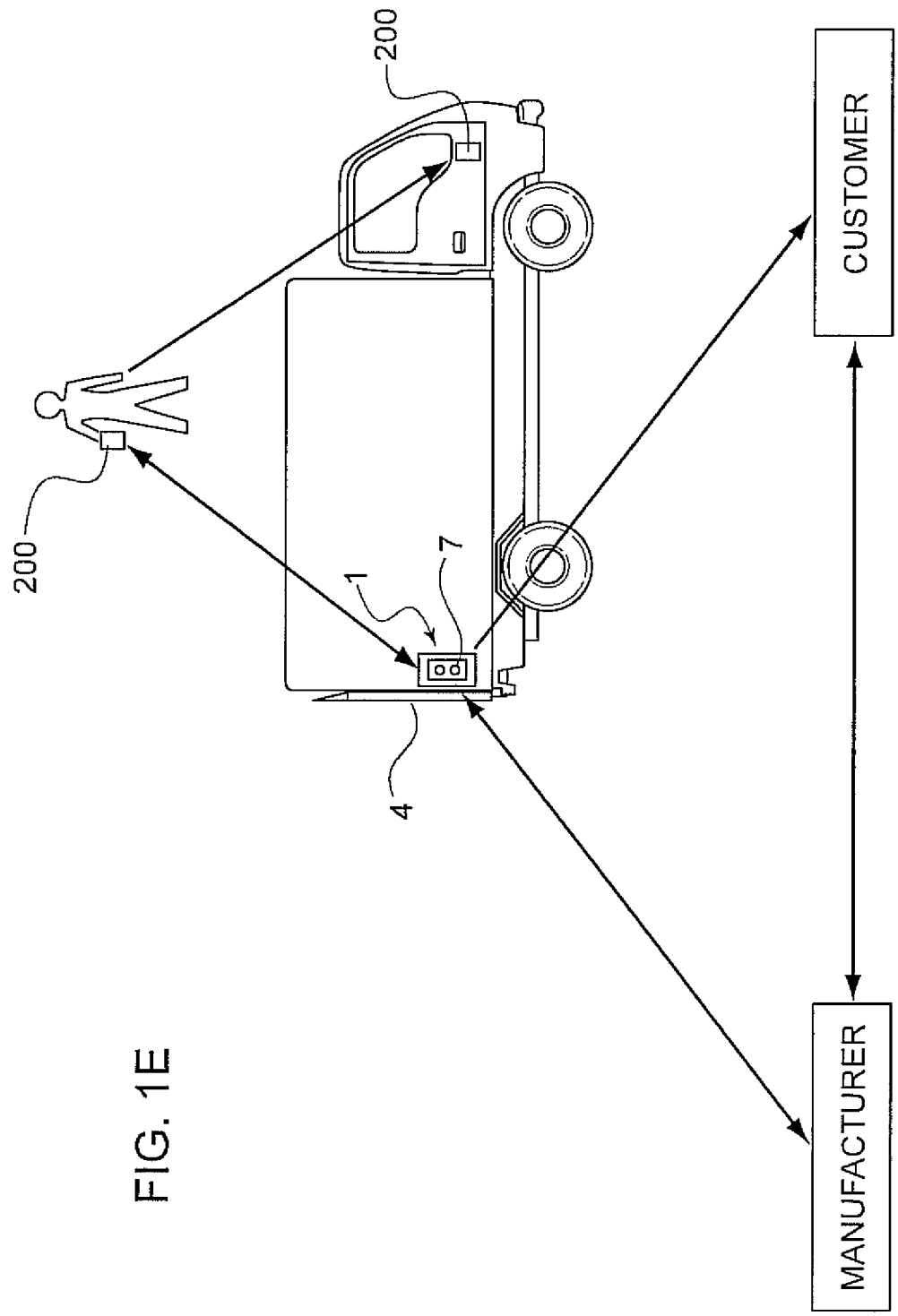
FIG. 1E shows a diagrammatic view of the lift control system according to an embodiment of the invention.

FIG. 1E shows an overview of the communication system capabilities according to an implementation of the invention. As shown, the lift 4, which is under the control of the control system 1 (via controller 7) is in communication with both the customer (owner of lift/vehicle) and the manufacturer (lift manufacturer). That is, the controller 7 enables wireless communication of lift conditions directly to the customer (via communication link 204) and the manufacturer (via communication link 202). In addition the manufacturer can be in direct communication with the customer via communication link 206.

As will be described in further detail below, the communication links 202, 204 and 206 are preferably wireless communication links, and links 202 and 204 can also be wired connections when the vehicle is at the customer or manufacturers locations.

According to a preferred implementation of the invention, the communication link 204 is one way to the customer, and as such, the customer cannot directly access the lift or the controller to make changes. Through this communication link, the customer will be able to find the liftgate (e.g., geographically) and identify components and/or retrieve information relating to the liftgate and/or any of its components and its operation. The customer will not, however, have the ability to make changes to the lift and/or its operation. The communication links 202 and 204 are two way communication links. Thus, communication link 202 allows the manufacturer to be in two way communication with the lift controller, and thereby enables them to: 1) reprogram one or more components of the lift; 2) verify the components (i.e., coded parts being used in system); 3) find components; and/or 4) retrieve information relating to the lift. The communication link 206 provides the customer and manufacturer with the ability to share information relating to the lift. In addition, this link 206 enables the customer to request or make changes to the lift operation only through the manufacturer. The manufacturer would then implement the changes (e.g., reprogramming) via the manufacturers communication link 202 to the lift control system 1. Alternatively, the customer could log into the manufacturer's website and request changes in settings or programming on the lift, and the manufacturer can implement such changes (e.g., allowable weight range), thus providing the customer with virtual communication capability with the lift system, but not direct communication.

As shown, the operator is provided with a cab cut off switch 200, which is commonly used in the industry. With this cab switch 200, the operator can operate the lift As used herein, the term lift gate system includes all parts and systems associated with the operation of the lift gate. For example, the lift gate system includes the lift itself, the battery, the electrical connections between the battery and all electronic components such as, for example, pumps, relays, switches, sensors, logic circuits, battery charge line, controls, etc., and the hydraulic system including the hydraulic lines, pumps, pressure sensors, etc.

Preferably, the lift controller 2 further includes a control panel 7, such as a switch panel, configured for receiving input data. Such input data, along with one or more operational parameters, are utilized by the logic circuit 3 for controlling operation of the lift 4 via control signals to the lift actuators 6. The input data can include one or more commands such as operator commands for desired operation of the lift 4.

A secondary switch 9 is optionally provided to enforce a two-hand operation as described in further detail below. The secondary switch 9 can be placed on the control panel 7.

FIGS. 2A and 2B show a front view and back view, respectively, of an embodiment of the control panel 7 including a flat panel 10 in accordance with an embodiment of the invention. Using a flat panel instead of a conventional protruding toggle switch can prevent inadvertent bumping into the switch by the operator. In addition, the flat panel provides more space for more switch inputs that enable more sophisticated logic modes in the operation of the lift.

The flat panel 10 includes buttons/keys for receiving operator input, and output devices for providing status information to the operator. The buttons/keys may have back illuminations for operations at night. The logic circuit 3 is programmed to send motion control signals to the lift 4 based on the operator input (e.g., button presses) on the panel 10, and operational parameters of the control system and/or the lift. The logic circuit 3 also provides control signals for providing status information via audio/visual output devices (e.g., lights, displays, speakers) on the panel 10. The information presented by the audio/visual output devices can be used by the operator in further operating the lift via input commands into the panel 10.

In this example, the front of the flat panel 10 includes a switch panel 10a (FIG. 2A) that provides an ENABLE button 11 that may be used to power on the controller 2. The button 11 may be replaced with a key hole or a key pad to ensure that only authorized personnel may power on the controller using a physical key or a code combination. After the ENABLE button 11 is pressed, the controller 2 is powered on so that the status of the controller 2 and the lift 4 can be displayed. In one example, after powering on, the controller 2 needs to be further enabled by pressing a combination of the buttons on the panel 10a. For example, in FIG. 2A, a combination of ENABLE 11, DOWN 13, DOWN 13, and UP 12 may be used to enable the controller 2 to control a motion of the lift.

The motion of the lift is primarily controlled with an UP button 12 and a DOWN button 13, which provide operator commands to the controller 2. The operational status of the controller 2 and other messages, such as the lift states (e.g., completely folded, in motion, completely open, etc.), may be indicated using a plurality of lights such as LEDs 14a-14d. Alternatively, a display such as an LCD 15 may be included to display graphical/textual information. A logo 10b can be displayed on the front surface of the flat panel switch.

The switch panel 10a may optionally include an emergency shut off button 10a for shutting off motion of the lift 4. Alternatively, emergency shut off may be achieved by a combination or sequence of command inputs via the buttons 11, 12, and 13. For example, the controller 2 may be programmed such that when the ENABLE button 11 is quickly pressed multiple times (e.g., three times) in sequence, the controller 2 shuts off the motion of the lift 4.

In this example, the LEDs 14a-14d are referred to as the ⅓ LED, the ⅔ LED, the FULL LED, and the THERM LED, respectively. The ⅓ LED 14a, the ⅔ LED 14b, and the FULL LED 14c, indicates electrical power status to one or more of: the control system 1, the lift 4, and the actuator 6. For example, the ⅓ LED 14a may flash for about 2 seconds, indicating that the voltage of an electrical power supply 8 (FIG. 1), such as a battery for the controller 2, is below a predetermined threshold. Following such a warning, the logic circuit 3 of the controller 2 may be shut down because of the low voltage. The input voltage for the controller 2 may be, for example, from a lower threshold of 8.0 V to 16.0 V.

In another example, the ⅓ LED 14a flashes if the voltage is below 12.0 V. The ⅓ LED 14a remains steady on if the voltage is above 12.0 V. The ⅔ LED 14d remains steady on if the voltage is above 12.3 V. The FULL LED will be steady on if the voltage is above 12.5 V. The FULL LED will flash if the voltage is above 15.5 V, and the lift motions may be disabled. Other voltage thresholds are possible based on circuit design of the controller 2 and the logic circuit 3.

Further, the THERM LED 14d indicates an overheating of a moving part of the lift 4 due to mechanical frictions, or as a result of high electrical current. As noted, the information presented by the LEDs 14a 14d can be used by the operator in further operating the lift by inputting commands into the panel 10. For example, the lift automatically stops due to overheating, the THERM LED 14d will notify the operator. Many different combinations of the illumination, color, and blinking may be used to convey different information to the operator via one or more of the LEDs 14a-14d. Other number of LEDs can also be used. For example, another LED may be included to indicate an over-the-maximum current situation when the controller 2 senses a current draw from a lift actuator 6 that is above a predetermined threshold (e.g., 12 amps).

As noted, the secondary switch 19 may be provided, such that e.g., if the secondary switch 19 is not pressed or closed by an operator of the lift, then the controller 2 disables any motion of the lift 4. When the switch 19 is placed on the panel 7, such as on the flat panel 10a shown in FIG. 2A, a distance d between the secondary switch 19 and the buttons 12, 13, is selected to be longer than a length of a typical hand such that a two-hand operation is enforced (e.g., a lift operator must continue pushing on the switch 19 with one hand while she operates switches 12, 13 with her other hand, in order for the controller 2 to allow motion of the lift 4). Alternatively, the secondary switch 19 may be provided separate from the panel 10.

In another implementation, an additional LED (not shown) can be provided to indicate the status of the secondary switch 19, wherein if the secondary switch input is open (e.g., not closed by an operator of the lift), then the additional LED remains steady on, indicating that the controller 2 has disabled any motion of the lift 4.

An example operation scenario as controlled by the controller 2 is now described. After the controller 2 is enabled, pressing buttons UP 12 and ENABLE 11 will cause the controller 2 to turn on a "raising" mode of the lift if the secondary switch 19 is closed (e.g., maintained pressed by the operator), and if the lift battery voltage is within a desired limit (e.g., less than 15.5 V). Pressing the button DOWN 13 will cause the controller 2 to turn on a "lowering" mode of the lift if the secondary switch 19 is closed, and if the lift battery voltage is within a desired limit (e.g., between 12.0 and 15.5 V). The operation cycles of the lift 4 are also counted by the controller 2, wherein in one example each cycle is defined by the lift being lowered for e.g. over five (5) seconds and then raised. The cycle counts can be used in estimating the maintenance need of the lift 4 and its components, and scheduling maintenance before an expected life span of the lift is reached.

The cycle count can be displayed by starting with the controller 2 as disabled, and then by pressing a sequence of buttons on the panel 10 such as ENABLE 11, UP 12, UP 12, DOWN 13. All four LEDs 14a-14d will turn on then off, and the number of cycles is flashed on the LEDs by the controller 2 as: THERM LED will flash for each 10000 cycles; FULL LED will flash for each 1000 cycles; ⅔ LED will flash for each 100 cycles; and ⅓ LED will flash for each 10 cycles. Other ways of displaying the cycle count are also possible, such as displaying such information as visual information (e.g., textual/graphical) on the display 15. The display 15 can also be used to textually/graphically display part of all of the information communicated by the LEDs 14a-14d. The LEDs 14a-14d can display the same type of information or different types of information about operation of the lift 4 as feedback to the lift operator.

The controller 2 may be programmed such that after a predetermined period of inactivity, e.g., two (2) minutes, the controller 2 becomes disabled automatically. In general, whenever the controller 2 is disabled, the lift 4 cannot be operated until the controller 2 is properly re-enabled to control motion of the lift as described herein.

The panel 10 is connected to the power source 8, to the controller 2, and the lift 4 through a bundle of electrical cables 16 via a connector 17 (FIG. 2B). The cables 16 allow transfer of power and control signals between the panel 10 and the controller 2. In one example, the panel 10 itself can be mounted e.g. on the back of a truck or trailer for controlling operation of a lift 4 there on. The panel 10 can be attached using screws through holes 18a and 18b. Alternatively, the panel 10 can be mounted using adhesives. Preferably, the material used to construct the panel 10 maintains its color and integrity against cracking, deformation, buckling and peeling.

Figure 2C:
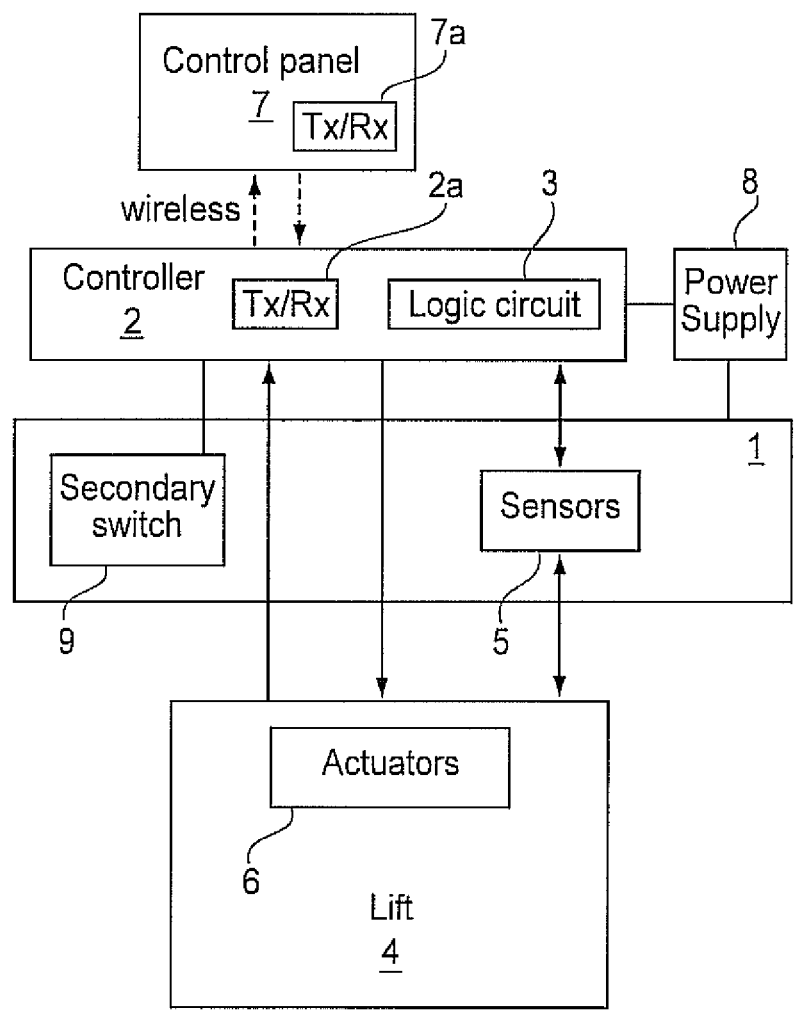
FIG. 2C shows a functional block diagram of an exemplary lift control system implementing a lift control method and the control panel of FIGS. 2A and 2B, according to another embodiment of the present invention.

Referring to FIG. 2C, a preferred embodiment of the present invention is shown where the control panel 7 is wirelessly connected to and in communication with the lift control system 1 using wireless technology such as, for example, radio frequency (RF), Bluetooth, Infrared (IR), WLANs, WiFi networks, Cellular networks, Satellite networks, etc.). This wireless connection will enable control signal communications between the switch panel 10 (as part of control panel 7) and the controller 2. The controller 2 includes a wireless transceiver (Tx/Rx) 2a for communication with a transceiver 7a in the control panel 7. Those of skill in the art will recognize that the transceiver 2a can be separated into a separate receiver and transmitter without departing from the scope of this disclosure. In such an embodiment, the lift 4 can be remotely controlled using a panel 10 that is not necessarily attached to (and is remotely located from) a vehicle carrying the lift 4. The panel 7 may comprise a transmit/receive module 7a, which wirelessly communicate with a transmit/receive module 2a included in the controller 2.

FIG. 3A shows an alternative configuration of the control panel 10, which is adhered to a connection box 20. The connection box 20 provides a pin out 21 that replaces part of the cables 16 and the connector 17 of FIGS. 2A and 2B, and transmits logic signals between the panel 10 and the controller 2. A plurality of plugs 22a-22e, corresponding to ground, DOWN, UP, battery, and the secondary switch, respectively, are used for the power electronics portion for the circuitry.

A programming header 23 is included for programming the logic circuit 3 of the controller 2. The programming header 23 is normally sealed after the controller 2 is programmed. When re-programming is necessary, the programming header 23 is un-sealed and is attached to a programming module for downloading new programs to the controller 2. FIG. 3B shows a functional schematic of an exemplary circuit 23a that may be used to implement the programming header 23. As shown, an input MOSI is the serial data input that is connected to a computer to program/reprogram the controller 2. The controller 2 is connected to a serial data output MISO during the programming/reprogramming operation. SCK is the serial data clock. Those of ordinary skill in the art will realize that other circuitry may be used to realize the programming header 23 of the present invention.

FIG. 3C shows an expanded top view of the pin out 21, including a perimeter socket 21a and a plurality of pin holes 21b. An arrangement of the pin out 21 in accordance with an embodiment of the invention is listed in the following Table 1.

TABLE 1

| Connector pin out. | | | |
|---|---|---|---|
| GND | 7 | 1 | EXTRA LED |
| ILLUM 2 (not used) | 8 | 2 | ILLUM 1 (not used) |
| ENABLE SWITCH | 9 | 3 | 1/3 LED |
| DOWN SWITCH | 10 | 4 | 2/3 LED |
| EXTRA SWITCH | 11 | 5 | FULL LED |
| UP SWITCH | 12 | 6 | OVER TEMP LED |

An alternative to using a plug-in programming module and the programming header 23 comprises wireless communication between the programming module and the controller 2. Thus, programs can be downloaded to the controller 2 wirelessly using, for example, RF transmissions.

Figure 4A:
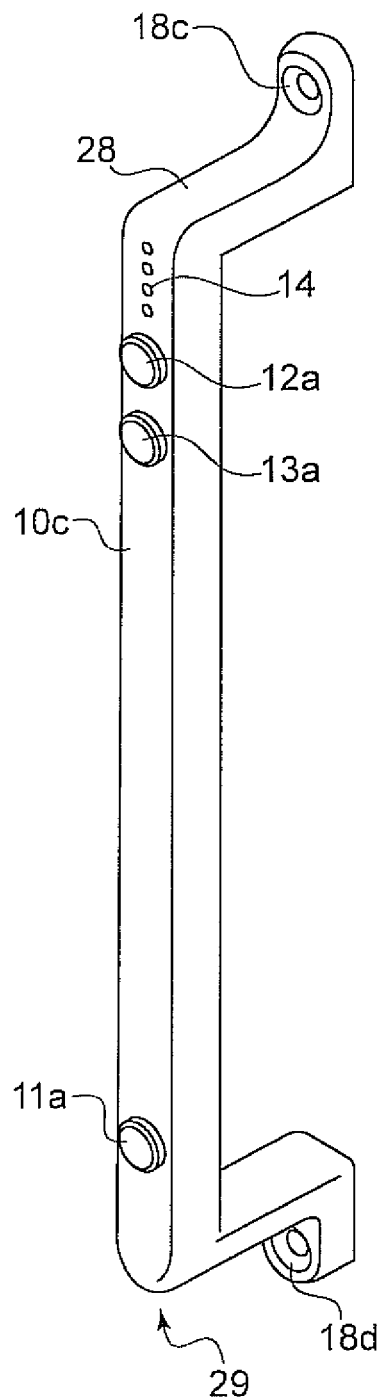
FIG. 4A is a perspective view of a controller switch panel integrated with a handle.
Figure 4B:
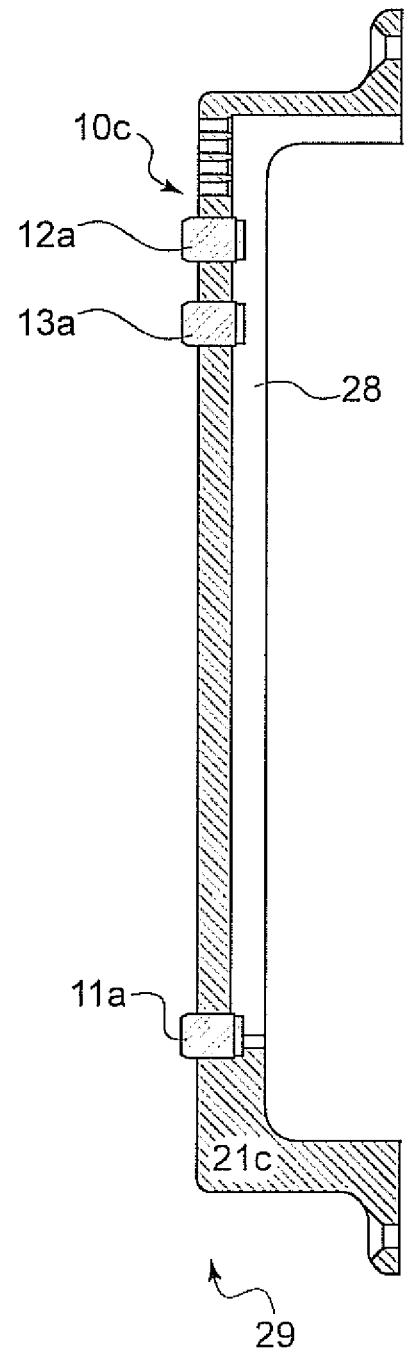
FIG. 4B is a cross-sectional side view of the switch/handle assembly of FIG. 3A.

Referring to FIGS. 4A-4B, in another embodiment, the control panel is implemented as a switch panel 10c that is integrated into a handle 28 of a support environment such as an exterior of a vehicle, forming an assembly 29. The assembly 29, integrating the switch panel 10c and the handle 28, can be coupled to a door or a sidewall of the vehicle using bolts or other coupling means through the holes 18c and 18d. One of the ends of the assembly 29 may also provide an electrical connector 21c similar to the pin out 21 illustrated in FIGS. 3A and 3C, for connecting the switch panel 10c to the controller 2 and the power supply 8. The switch panel 10c may also provide a plurality of LEDs 14 similar to those in FIG. 2A. A number of buttons 11a-13a may also be provided, similar to those in FIG. 2A.

Figure 5A:
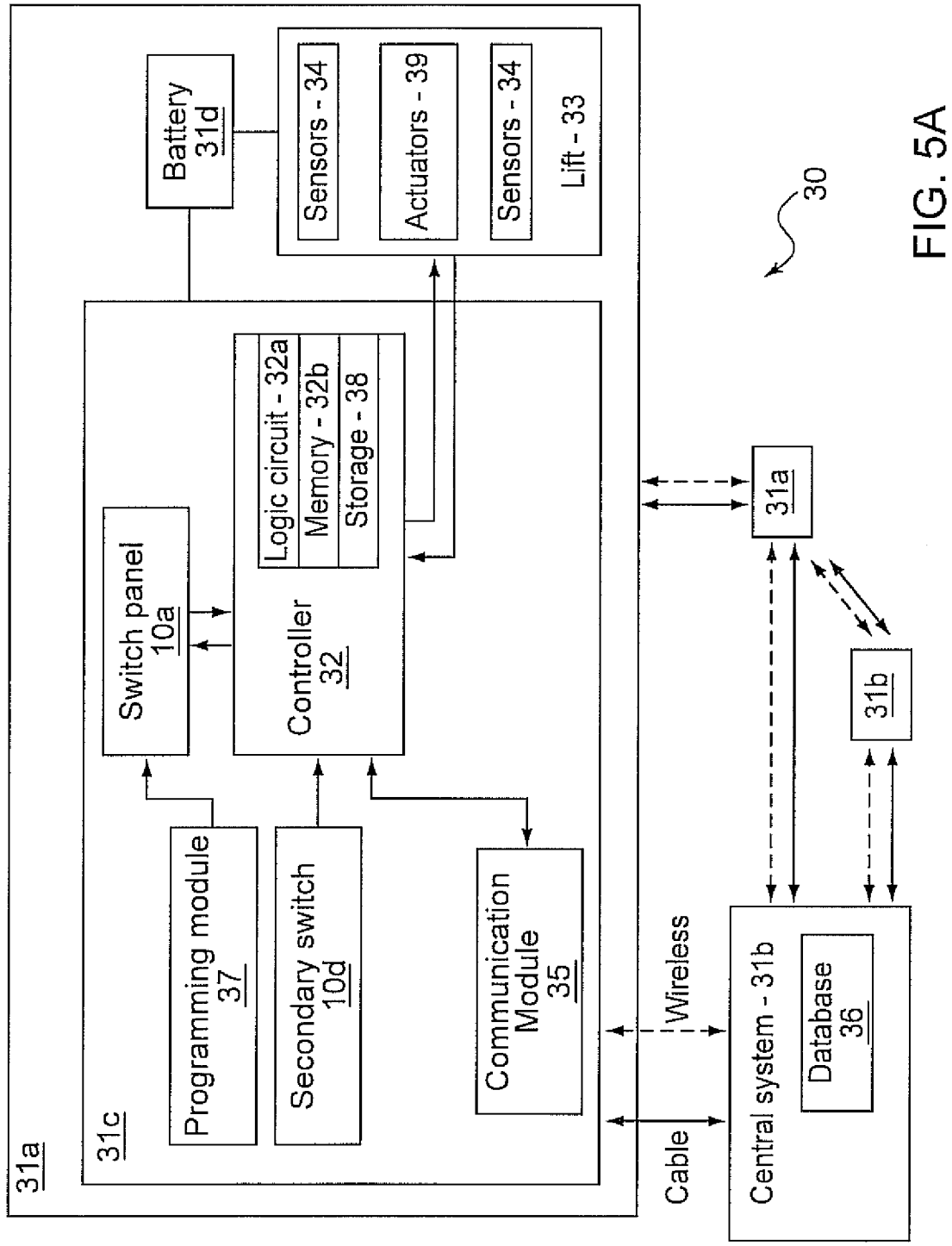
FIG. 5A shows a functional block diagram for a control and logging system for a fleet of lift subsystems.

In another preferred embodiment, the present invention provides a system including a field subsystem in wireless communication with a central station. FIG. 5A shows a functional block diagram of such a system 30 including one or more field subsystems 31a and one or more central stations 31b in wireless communication with each other. In this example, the field subsystem 31a includes the lift gate system including the lift 33 and a control system 31c similar in function to the control system 1 in FIG. 1, for controlling motions of the lift 33. Typically the field subsystem 31a is disposed on a vehicle or on a site which may be remote from the central station 31b. The central station 31b gathers various operational data from the field subsystem 31a (e.g., a vehicle) about operation of the lift 33 for analysis and control.

The control system 31c of the field subsystem 31a includes a controller 32, which includes functionality of the controller 2 shown in FIG. 1, for controlling the lift 33. The controller 32 includes a control logic circuit 32a including functionality of the logic circuit 3 in FIG. 1, to control operation modes of the lift 33. The controller 32 may also include memory 32b, such as, for example, an Electrically Erasable Programmable Read-Only Memory (EEPROM) or Random Access Memory (RAM), for storing, for example, control program instructions loaded from the programming module 37, control parameters such as the voltage threshold discussed earlier, and data relating to the operation of the lift gate (e.g., number of uses, temperature, location, etc.). Alternatively, the memory could be a Flash RAM, or any other type of memory device that is programmable.

An operator operates the lift gate system having a lift 33 by inputting commands into the switch panel 10a. The lift gate system and lift 33 has sensors 34 installed thereon for monitoring various operational parameters of the system and lift 33 such as the actuator 39, operational cycles, etc. The sensors 34 may include, for example, one or more of: a position sensor for sensing whether the lift 33 is fully extended or in a completely closed position, a motion sensor for sensing a motion of the lift 33, a load sensor for sensing the mechanical load applied to the lift platform, a temperature sensor for sensing a temperature at moving parts of the lift 33 or at an electrical connection to the controller 32, a counter that aids the controller 32 in counting the cycles of operation of the lift 33, etc. As explained below in more detail, all data collected by the sensors and/or input by the operator is wirelessly transmitted to one or more central stations 31b, where the data is analyzed and corresponding control instructions (or diagnostic information) can be sent directly from the central station 31b to the corresponding field subsystem 31a via the controller 32 within the control system 31c.

The recorded cycle data helps in remotely diagnosing problems associated with a particular vehicle/lift gate system, which would have obvious applications in determining when to perform certain inspections and/or preventative maintenance. For example, after a first predetermined threshold, e.g., after 5000 cycles, the lift fluids and hoses may be inspected for chafing. After a second predetermined threshold, e.g., after 10,000 cycles, the lift pins may be inspected. The recording of operation cycles of each lift is particularly useful in managing a fleet of trucks with subsystems 31a, such that the operation cycles for each truck may be tracked, and the workload may be more evenly distributed among the fleet.

Figure 5B:
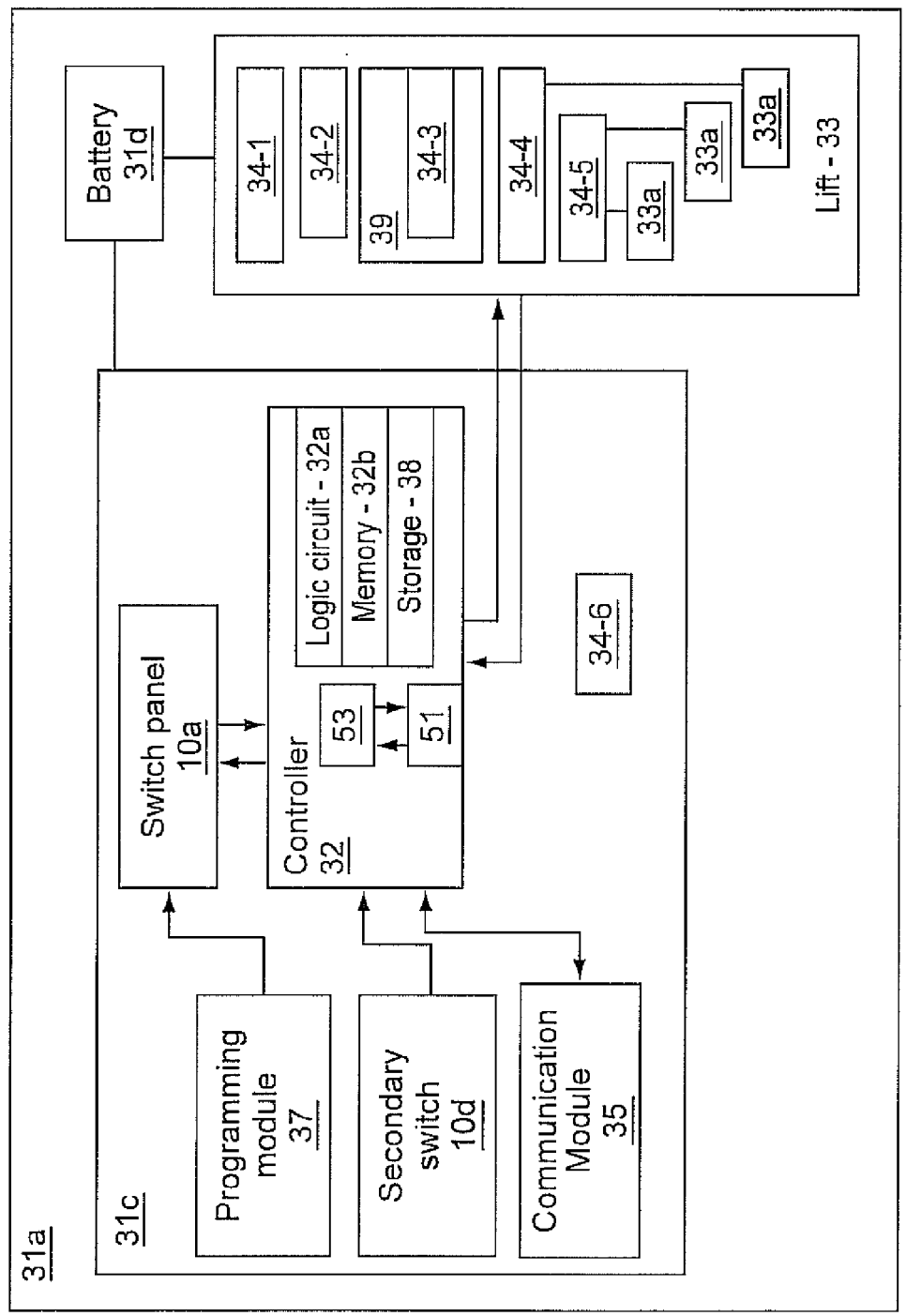
FIG. 5B shows a functional block diagram for a lift subsystem including a plurality of sensors.

FIG. 5B shows a functional block diagram for a lift (field) subsystem 31a including a plurality of sensors with more details. A timer/clock 34-1 may be included as part of the sensors 34 such that the lifespan of the components may be monitored throughout the field operations of the lift. With the timer or clock 34-1, normal and abnormal operations of the lift may be monitored. For example, together with a current sensor or amp meter 34-2, an operation settings and conditions vs. time may be recorded. Such parameters can be used to monitor the wear of actuators 39 and to diagnose potential electrical problems. The clock in conjunction with voltmeter and amp meter 34-2 can also be used to record status of a battery 31d, magnitude of the loads on the lift 33, electrical loads on the battery 31d, number of lift cycles remaining using the current condition, and settings of the battery 31d, etc. Through the application of the various sensors, the control system 31c within a lift (field) subsystem 31a can provide error messages to the operator. These error messages can be generated by the control system 31c or may be remotely generated by the central station 31b and wirelessly transmitted to the respective lift (field) subsystem 31a at the appropriate time to inform the operator of the same.

As will be appreciated from the above description, the central station 31b includes the ability to maintain two-way wireless communication with each and every field subsystem 31a and can thereby monitor the operation of the same, for purposes such as safety, maintenance, etc.

By including a pressure transducer 34-3 for the actuators 39, such as a hydraulic system, the pressure in the hydraulics (in units of PSI) can be sensed to in turn monitor whether the lift 33 is being overloaded.

A temperature sensor 34-4 may be included to sense whether the lift is being operated in hot or cold weather, which may in turn determine the time intervals for preventative maintenance such as oil change. The temperature sensor 34-4 may be realized using a thermistor or thermometer. More temperature sensors may be included to monitor the oil temperature and the temperature of the motor 33c.

A plurality of other types of sensors, denoted generally as a module 34-5, may also be included. For example, a level sensor may be used to measure positions such as angular positions of the loading surface (platform) 33a of the lift 33. The operator can thus be informed whether the platform is tilted too far. In accordance with some embodiments of the invention, an automatic leveling mechanism may be included in the actuators 39, which uses the feedback from the level sensor to adjust the platform and automatically level the platform.

Other position sensors may be included in the module 34-5 to measure positions of the lifting arms and ramps. Such position sensors may employ magnetic switches and electromagnetic sensors. A fluid level sensor in a fluid reservoir may be used to detect, for example, oil level when hydraulic actuators are used. This ensures a proper fluid level in the reservoir 33b. A low level of fluid may indicate a leak, and the operator may be provided with a warning signal. An impact sensor may be included to measure how hard the vehicle carrying the subsystem 31a impacts a loading dock, and how hard the lift gate is hit by foreign objects. This helps in ensuring the operational limits of the lift are met, and are not exceeded. An interlock sensor may also be included to send a signal to the operator if the platform 33a and/or walk ramp of the lift are not stowed when the vehicle is not in a parked position. This helps ensure a predetermined operation relation between the state of the vehicle and the state of the lift. A speed sensor may be included to sense a speed in cycles of the lift during operation. The measured speed may be compared with the model specification of the lift for the operator to determine if the lift moves within the specified speed range. The speed sensor may be realized using, for example, an acceleration sensor, a flow meters a rotary sensor, a linear actuator on a cylinder, or a velocity sensor.

Other sensors may be used to monitor additional/different operational parameters. For example, a geographic positioning system (GPS) unit 34-6 may be included to obtain geographical location of the lift. Such information in turn may be combined with the temperature data and the weather information to determine whether more maintenance is required as a result of icy/snowy weather, which in turn indicates that deicing chemicals, such as MgCl, may be used in the environment for deicing, which may in turn have an impact on the corrosion of the lift components. For example, if the GPS unit says the lift is operating in Nebraska, the system can: automatically change to power down mode in winter months; reduce maintenance cycles to bring the lift in for service more often; and a note to maintenance may be made to use a thinner oil for the cold weather environment. A motor brush sensor may be used to inform the operator when to replace the motor. A fingerprint scanner may be used to ensure that the operator is authorized to operate the lift.

Information about the operation of the lift gate system from various sensors, as described above, is recorded and stored in memory by the controller system 31c in each field subsystem 31a. Such information provides historical data for the operation of the lift, which may be used to determine maintenance cycles, abuse of the lift, jamming, etc. For example, the sensed data from the sensors may be sent to an I/O 51 of the controller 32, and may be processed locally using a processor 53, and/or stored locally in a storage medium 38 such as a memory or a flash memory card attached to the controller 32. Then the stored data may be downloaded to one or more central stations 31b wirelessly, and/or via a cable (e.g., via a data connection port 34-8 (FIG. 5B)), at home bases or docking stations. The sensed data may also be wirelessly transmitted from one or more field subsystems 31a to one or more central subsystems 31b wirelessly in realtime. According to one implementation, the stored data in the memory 32b of each controller 32 (of each control system 31c within each field subsystem 31a) is at least maintained (i.e., not deleted) until the controller receives a confirmation of receipt by the central station 31b. In this manner, the stored data is never lost in transmission, and/or erased from the memory of the controller prior to being received by the central station(s) 31b. According to another implementation, the controller 32 may require a request from the central station 31b prior to sending the stored data to the respective central station. Once sent the central station 31b would send a confirmation of receipt message back to the controllers 32 indicating that their respective memory can be deleted, or overwritten.

The wireless transmission of data between the central stations 31b and the field subsystems 31a can be performed using a WiFi network or other wireless network (e.g., WLAN, cellular networks, satellite networks, etc.). The wireless network can be a secure network or a non-secure network. A secure network can be one where only access is provided to authorized controllers and remote central stations. In this manner, the security of information being transmitted may be maintained by the fleet or vehicle operators.

Through the implementation of a wireless network, when a vehicle in a fleet having the field subsystems with the controllers of the present invention enters the wireless network coverage area (e.g., WiFi, WLAN, Cellular network, Satellite network or any other wireless network), any stored information in the field subsystem 31a can be automatically and wirelessly transmitted to the remotely located central station 31b, where the appropriate diagnostics and updates on the particular vehicle's operation and lift gate use can be made and if required, a subsequent satisfaction or non-satisfaction response can be provided back to the lift controller.

Figure 5C:
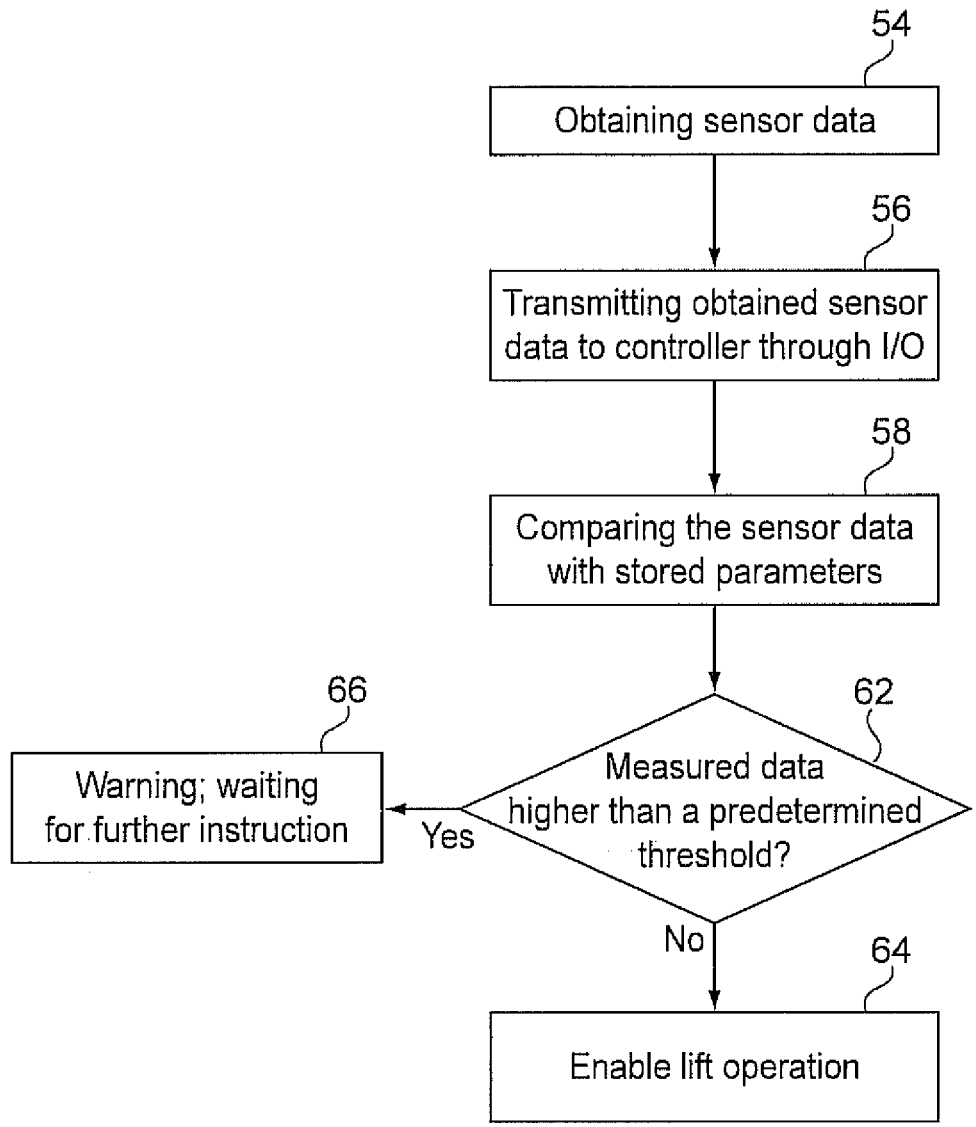
FIG. 5C is a flowchart of an exemplary operation method of a sensor within the lift subsystem.

An exemplary process 52 is shown in the flowchart in FIG. 5C for lift gate system operation based on sensor information, e.g., the temperature sensor 34-4. In step 54, the temperature data is obtained from the temperature sensor 34-4. In step 56, the obtained temperature data is transmitted from the lift 33 through the I/O 51 to the controller 32. In step 58, the obtained temperature data is compared with predetermined parameters stored, e.g., in the local memory 32b or remotely provided by the central station. In step 62, the measured data (e.g., temperature) is compared with a predetermined threshold. If the temperature is in the acceptable range, in step 64, the lift operation may be enabled. If the temperature is too high, in step 66 a warning or error message may be sent to the lift operator.

An implementation of controlling the operation of the lift gate system and lift 33 by the controller 32 is now described. Under the control of the controller 32, the lift 33 is actuated by actuators 39. The actuators 39 may be hydraulic actuators or electrical actuators. Where a hydraulic actuator is used, the lift 33 may require a certain wait time to "recharge," e.g., to allow the hydraulic fluids to flow back to a hydraulic pump between operation cycles. Such a wait time can be taken into account in the programming of the logic circuit 32a to ensure proper operation. For example, the logic circuit 32a may be programmed such that the motions of the lift 33 are only enabled after the wait time between operation cycles. Alternatively, a sensor (not shown) may be used to sense whether the pump is fully recharged.

In another implementation, the controller and corresponding memory can be programmed to delay the start up of the motor/pump upon activation of the lift in the lift gate system. This delay is useful in allowing the solenoids that need to actuate at the same time as the motor/pump to be at full operating voltage when the pump motor kicks on. Those of skill in the art will recognize that when the pump motor turns on, the voltage in the system can drop across the solenoids, in which case the solenoids cannot activate as intended. When the solenoids to not have proper operating voltage (i.e., the applied voltage is too low), the solenoid cannot actuate and can cause problems in the proper operation of the lift gate. By way of example, this delay can be anywhere from 1 ms-500 ms, but may have a longer range of 1 ms-5 second depending on the desired need and/or application.

When the field subsystem 31a is disposed on a vehicle, the switch panel 10a may be installed such that the operator must stay off the lift platform in order to operate the switch panel 10a to enable the controller 32. At the same time, the operator should be able to observe the lift 33 while pressing buttons on the switch panel 10a. Thus, a lift operation requirement for the operator is enforced. In addition, this may avoid overstressing the lift as it is generally inadvisable to apply a load to the lift platform when the lift is in motion, i.e., when the platform is not fully extended. This is one of many different safety conditions that can be monitored and addressed by the central station in wireless communication with the respective controllers. Examples of other safety features that can be implemented using the controller of the present invention, include: the preventing movement of the truck based on the position of the lift platform; determining if the projected motion path of the lift is clear (i.e., no obstructions); the battery condition of the liftgate system; the lift temperature, which can include the hydraulic fluid temperature; motor and pump oils; ambient temperature, etc.

The dimensions and button placement on the switch panel 10a, and/or the control logic of the logic circuit 32a of the controller 32, can be such to allow the operator to enter commands into the switch panel 10a with one hand for operating the lift, or to require the operator to enter commands into the switch panel 10a simultaneously with two hands for operating the lift. For example, the controller 32 may be programmed by control logic such that a "raise" or "lowering" motion of the lift platform can only take place when the ENABLE button 11 and one of the UP button 12 and the DOWN button 13 are simultaneously pressed by the operator. Alternatively, when the optional secondary switch 19 is installed, the controller 32 may be programmed by control logic such that a "raise" or "lowering" motion of the lift platform can only take place when the secondary switch 19 and one of the UP button 12 and the DOWN button 13 are simultaneously pressed by the operator. As discussed earlier, the switch panel 10a may be designed such that the distance d between the ENABLE button 11 and the DOWN button 13, or the distance between the secondary switch 19 and the DOWN button 13, is larger than a length of a typical hand. Thus, the operator is forced to use both hands to operate the lift 33.

Alternatively, a secondary switch 10d may be implemented in the field subsystem 31a, and installed separately from the switch panel 10a, whereby according to the control logic in the logic circuit 32a of the controller 32 the operator must operate the switch panel 10a using one hand, while simultaneously pressing the secondary switch 10d using another hand, to raise or lower the lift platform.

The operation sequences, the control logic, and the display sequences of the LEDs 14a-14d may be pre-programmed into the logic circuit 32a of the controller 32. In addition, a portable programming module 37 may be connected to the programming header 23 on the back of the switch panel 10a to download new control logic/programs into the logic circuit 32a of the controller 32.

The field subsystem 31a further includes a communication module 35, which reads data from the sensors 34 and/or from the storage medium 38, and transmits the data to the central station 31b to be stored in a database 36. The communication module 35 may comprise a data downloader adapted to be plugged to an optional data port on the switch panel 10a by wire. Alternatively, the communication module 35 may communicate with the sensors 34 or the storage medium 38 wirelessly, for example, using RF communications. Further, the communication module 35 may transmit data to the central station 31b by wire when the communication module is physically connected to the central station 31, e.g., when a truck including the field subsystem 31a returns to a station and is coupled to the central station 31b to download operation data from the sensors 34 and/or storage medium 38 into a database 36.

According to a preferred implementation, the communication module 35 comprises a wireless transceiver whereby the communication module 35 transmits operation data from the sensors 34 and/or storage 38 to the central station 31 wirelessly. The communication module 35 can also receive data/programming from the central station 31 for use by the controller 32 or remotely programming the logic circuit 32a. The communication module 35 may use wireless communication means existing in the vehicle or possessed by the operator, such as satellite communications, radios, cellular phones, landlines, and facsimile machines, optical, IR, and other telemetric means. Other non-limiting examples of wireless communication methods that can be implemented by the present invention may include, cellular or satellite networks, radio frequencies (RF), Bluetooth, WiFi, WLANs, and Infrared (IR). The data transmission may be in analog or digital forms. Similar communications and/or wireless communication means may be established between field subsystems 31a, between central stations 31b, and among any of the field subsystems 31a and the central stations 31b.

The lift operation data collected in the database 36 may be analyzed for various purposes including determining e.g., whether the lift 33 is being operated correctly, whether certain safety measures are being observed, is the lift overstressed, and/or does the lift need maintenance. In addition, data such as the operation cycles of the lift may help determine whether the lift gate system and/or any of its components has reached their life limit.

Figure 5D:
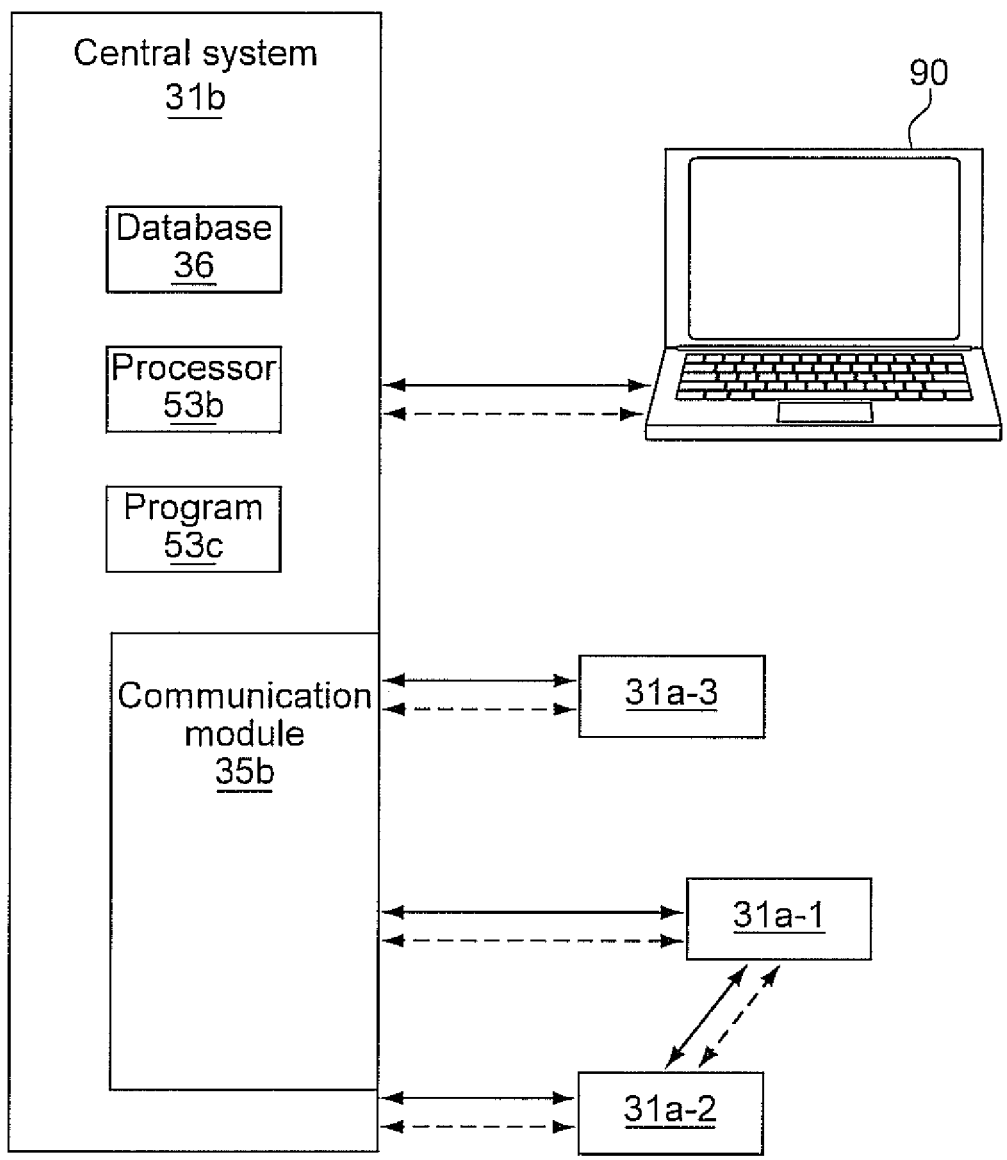
FIG. 5D is a functional block diagram for a central station.

FIG. 5D a functional block diagram for a central station 31b used to manage a fleet of vehicles with field subsystems 31a-1, 31a-2, 31a3, etc. The central station 31b may comprise a communication module 35b that communicates with the fleet of field subsystems 31a-1, 31a-2, 31a-3, wirelessly and/or through data cables (in real time or batch mode), to collect data gathered by the lift gate system under the control of the field subsystem controllers (e.g., from memory 32b, storage 38, etc). The collected data may be stored in a database 36, and may be processed by a processor 53b. In addition, the central station 31b may communicate with a computer 90 or a computer network for further processing of the received data. A program module 53c provides instructions for execution by the processor 53b to analyze the collected data and provide any necessary error, warning or affirmation messages to the operator. The error and/or warning messages can take many different forms, including, for example, voice warnings, audible tones or sounds, visual lights or indicators, etc. In accordance with one implementation, the error/warning messages can be in response to a GPS determined conditions of the vehicle. For example, the GPS device on the vehicle indicates the vehicle is entering a cold climate area and as such, the controller within the field subsystem could warn the operator that the temperature may affect the operation of the lift gate system. The controller would then send the error/warning message to the remotely located central station.

Figure 5E:
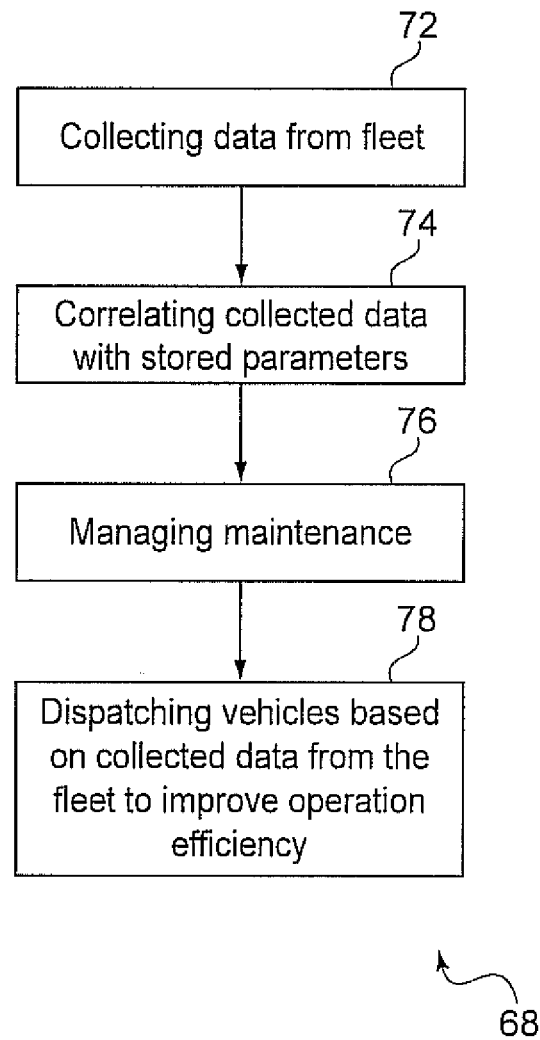
FIG. 5E is a flow chart illustrating an operation of the central station for managing a fleet of vehicles with lift systems according to an embodiment of the invention.

Based on the analysis of the data collected from the fleet, a central station operator may manage which vehicles with lifts are dispatched to which areas. For example, if some of the vehicle lifts in the fleet have been operated in normal conditions, and their next scheduled maintenances are note immediate, these vehicles may be dispatched to heavy duty tasks. Such a management may be realized using management software implemented by the program 53c and/or on the computer or computer network 90. The data collected from the fleet, including the operation conditions and geographical locations, enable an efficient management of the fleet. FIG. 5E shows an exemplary process 68 for using the central station 31b for analyzing collected data and managing a fleet of vehicles with installed subsystems (e.g., 31a-1, 31a-2, 31a-3). In step 72, data from the fleet are collected. In step 74, the collected data is correlated with stored parameters to determine, for example, whether certain vehicles in the fleet are due for maintenance. In step 76, vehicles due for maintenance and overhauls are sent to maintenance facilities. In step 78, vehicles are dispatched based on the collected data from the fleet. The fleet management may be based on a software control, or based on input from an operator.

Figure 6:
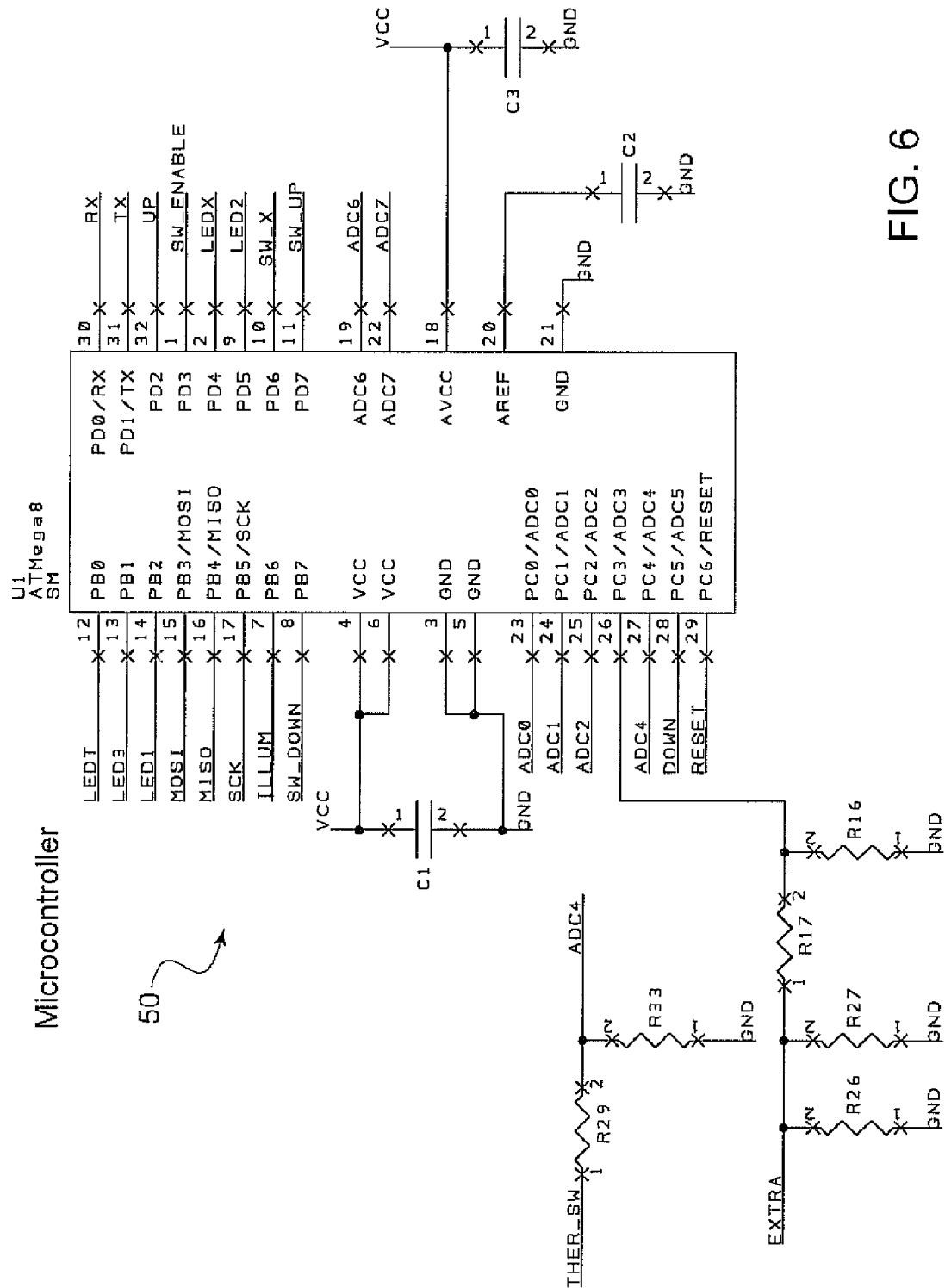
FIG. 6 is a circuit diagram of an exemplary circuit used to implement the microcontroller.
Figure 7A:
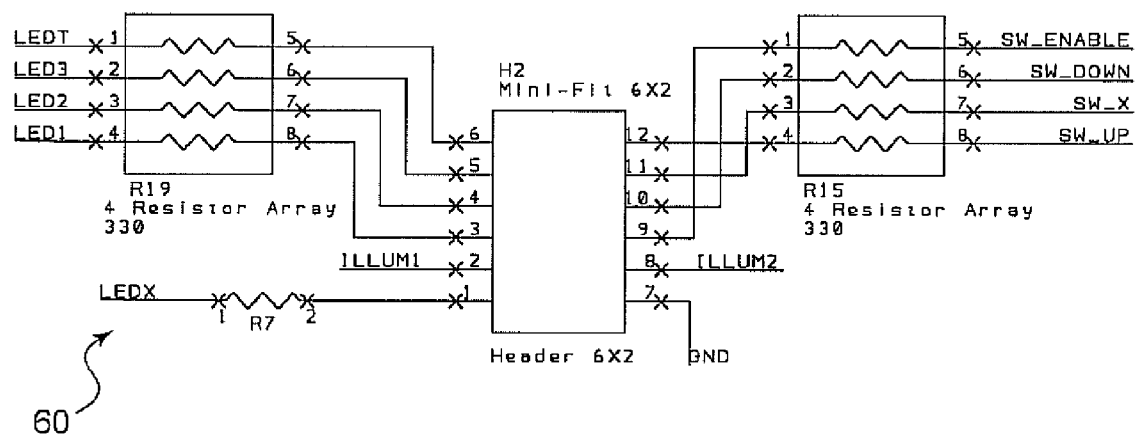
FIG. 7A is a circuit diagram of an exemplary circuit used to implement the keypad connections.
Figure 7B:
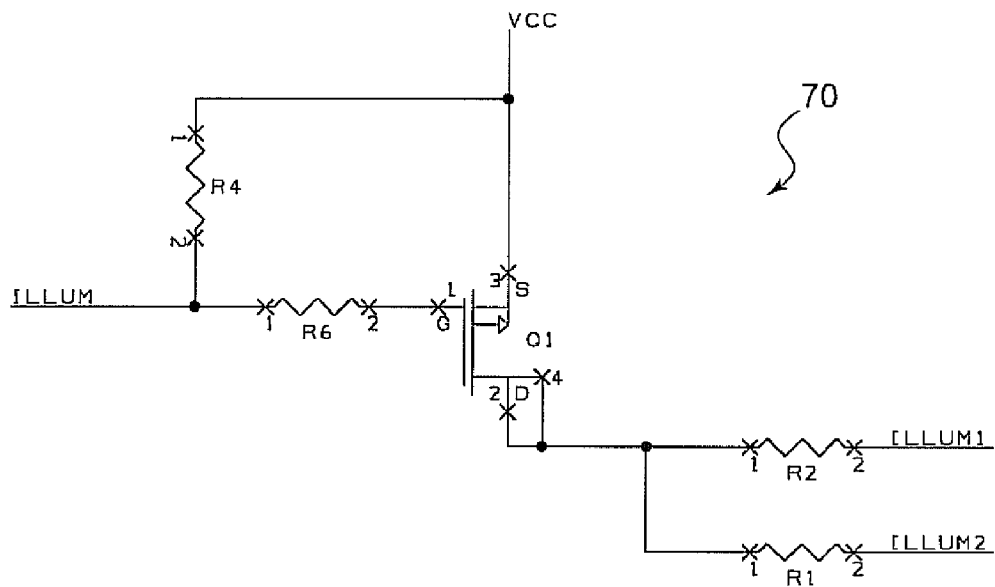
FIG. 7B is a circuit diagram of an exemplary circuit used to implement the keypad illumination functions.

FIG. 6 shows an implementation of the logic circuit 32a including a microcontroller 50 that executes program instructions for controlling operation of the lift. FIG. 7A shows an exemplary circuit 60 for the switch panel 10a connection. The back illumination for the buttons for night operations, and the LED indications on the switch panel 10a may be realized using the circuitry 70 as shown in FIG. 7B. The data ports having the same names are connected. For example, ILLUM in the Microcontroller circuit 50 is connected to ILLUM in the keypad illumination circuit 70.

Figure 8A:
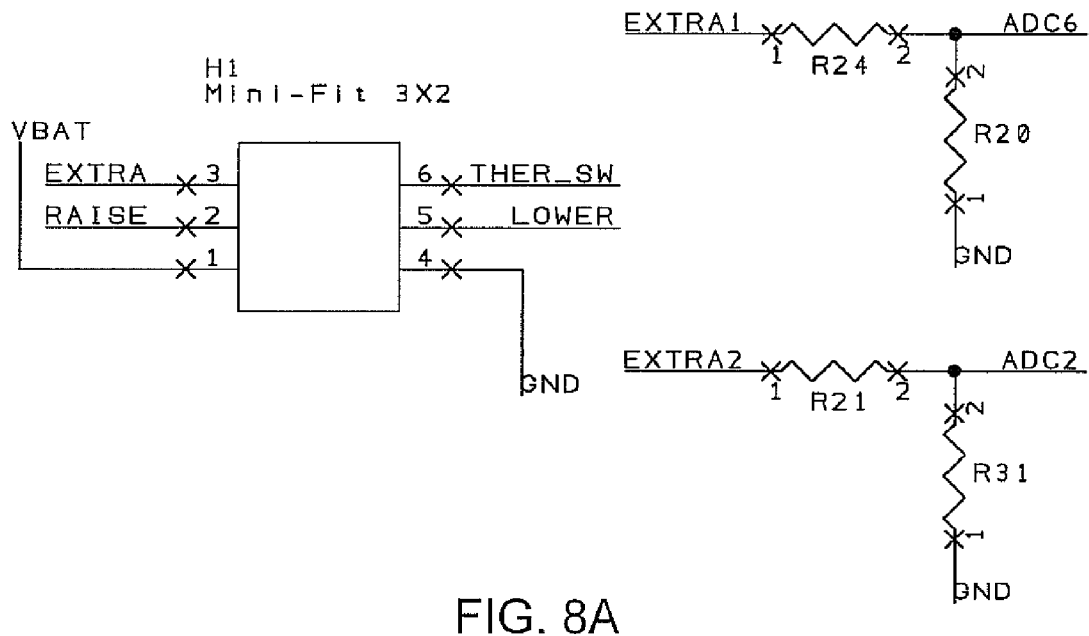
FIGS. 8A and 8B are circuit diagrams of exemplary circuits used to implement the I/O connections of the microcontroller and the switch.
Figure 8B:
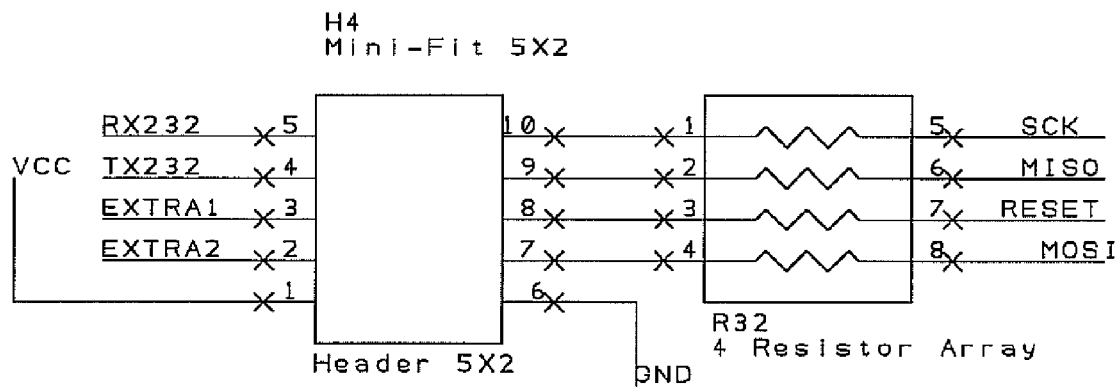
Figure 9A:
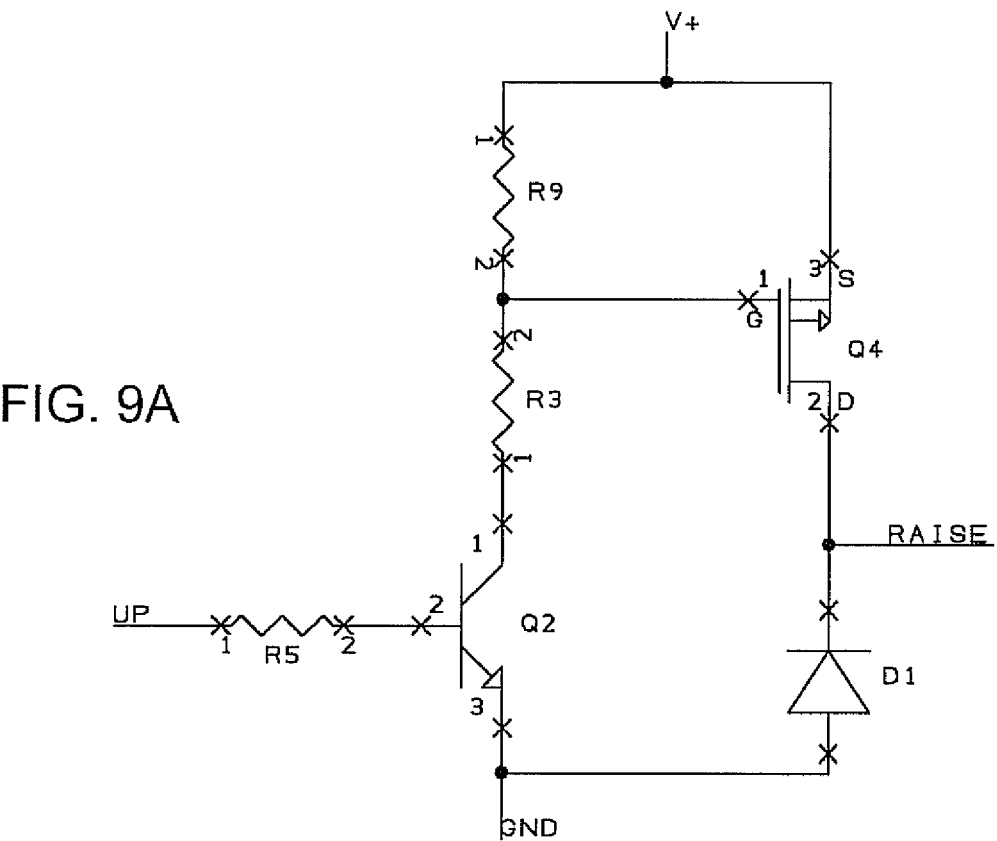
FIGS. 9A and 9B are circuit diagrams of exemplary circuits used to implement the controls of UP and DOWN operations, respectively.
Figure 9B:
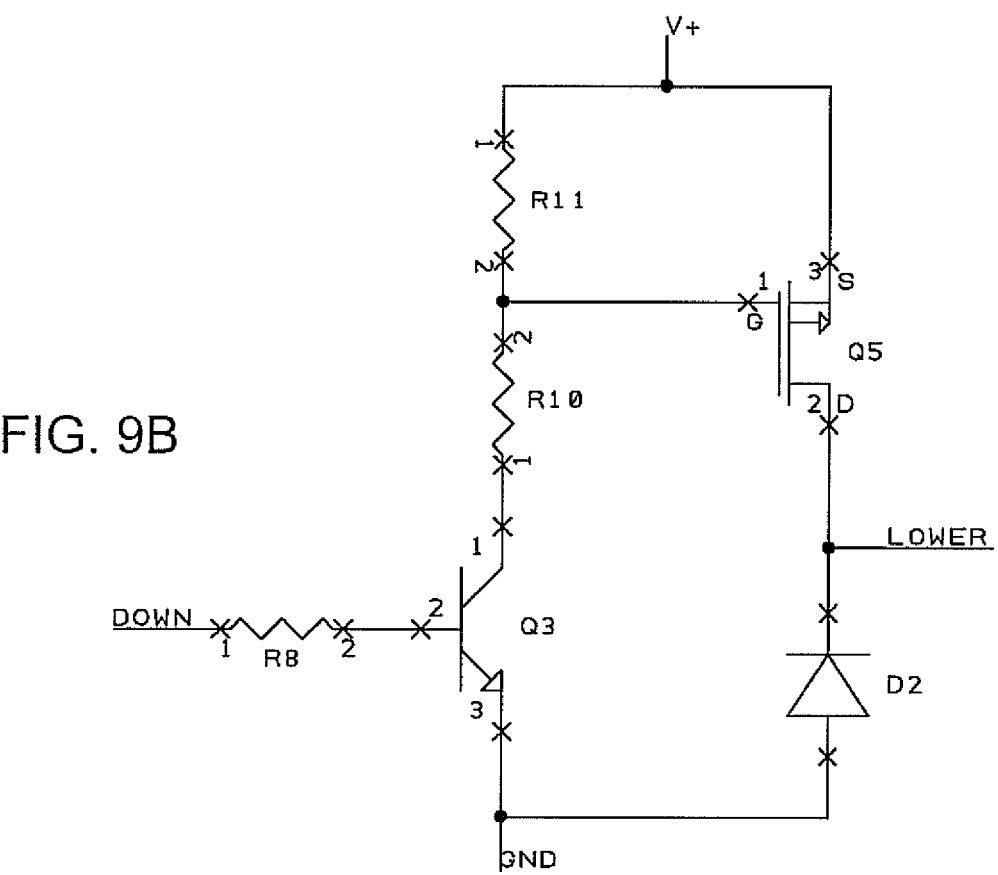

The I/O connections and optional extra I/O connections are illustrated in FIG. 8A and FIG. 8B, respectively. Exemplary output circuitry for the UP and DOWN controls are shown in FIG. 9A and FIG. 9B, respectively. As shown, the PN2222 is an NPN general-purpose transistor used to invert the output signal from the microcontroller 50. The microcontroller 50 outputs a positive voltage (e.g., 5V) that turns on the NPN transistor, which in turn pulls the gate of the P-channel MOSFET (IRF5305) low, thus turning on the MOSFET and connecting V+ to the output. The output is connected to a solenoid on the lift 33.

In accordance with an embodiment of the invention, the vehicle electrical system supplies V+ and VCC, both of which can be regulated to voltages different from that of the vehicle electrical system. For example, V+ can be set to 12.0 V to 15.0 V, while VCC is typically regulated to 5.0 V.

Figure 10:
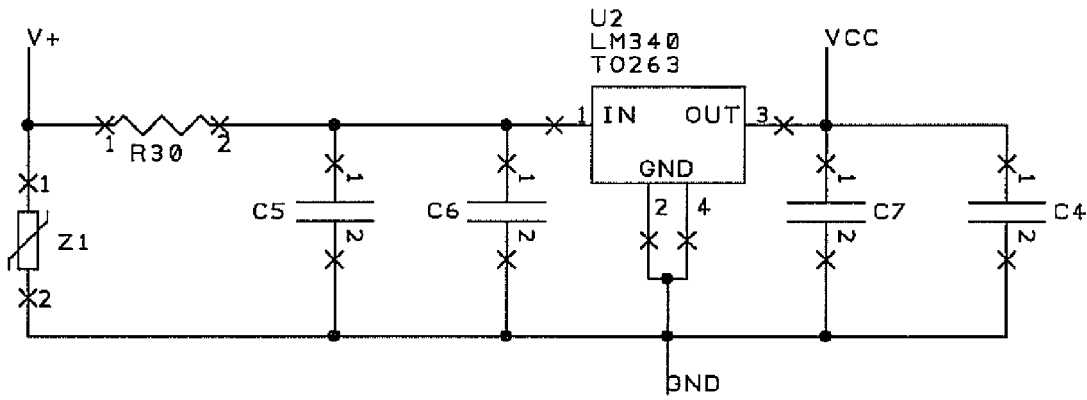
FIG. 10 is a circuit diagram of an exemplary circuit used to implement surge protection and voltage regulation functions of the controller.
Figure 11:
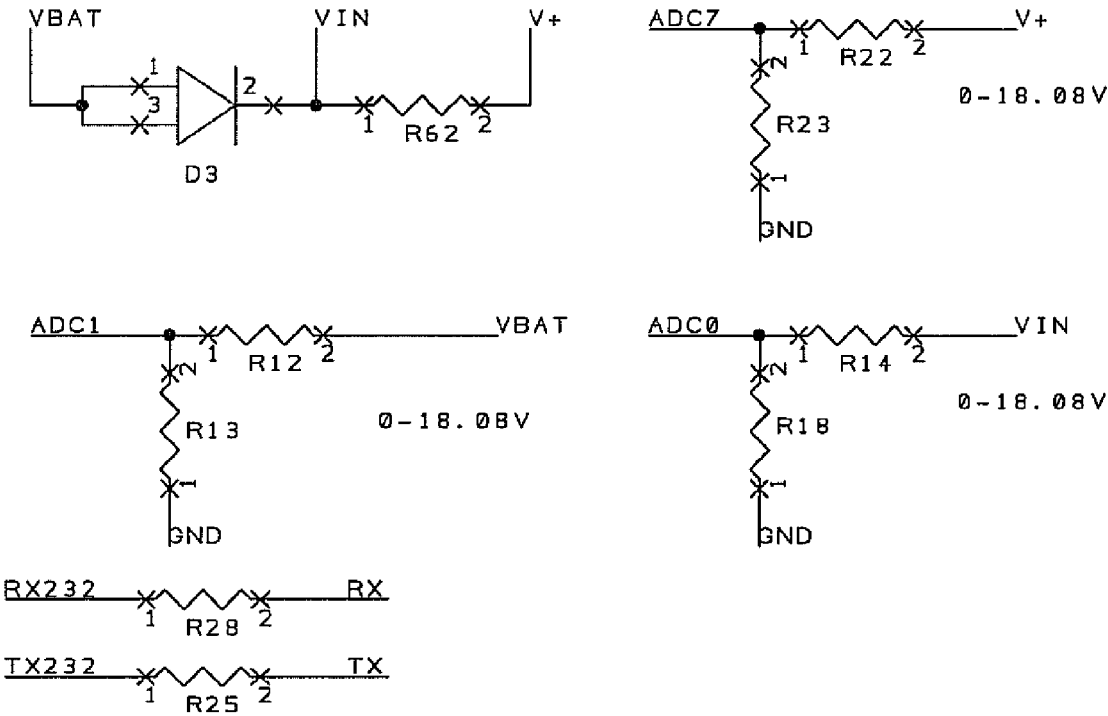
FIG. 11 is a circuit diagram of an exemplary circuit used to implement reverse protection and current sensing functions of the controller.

The controller 32 has a built-in surge protection and voltage regulation circuit 100 shown in FIG. 10, and a reverse protection and current sensing circuit 110 shown in FIG. 11. As shown, the diode (D3) provides the reverse protection, and the resistor (R62) is used as a current-sensing resistor. The voltage on both sides of the resistor are divided down with the resistors R22 and R24, and also R14 and R18, and are then measured with the built-in analog-to-digital converter (ADC) on the microcontroller 50. By using Ohm's law, the current through the resistor is calculated by dividing the voltage difference across the resistor by the resistance of the resistor.

Those of ordinary skill in the art will recognize that, the circuit diagrams shown throughout the disclosure are by way of example only, and do not limit the scope of the invention to these circuits. Rather, many other different circuits may be used to implement embodiments of the invention.

Figure 12A:
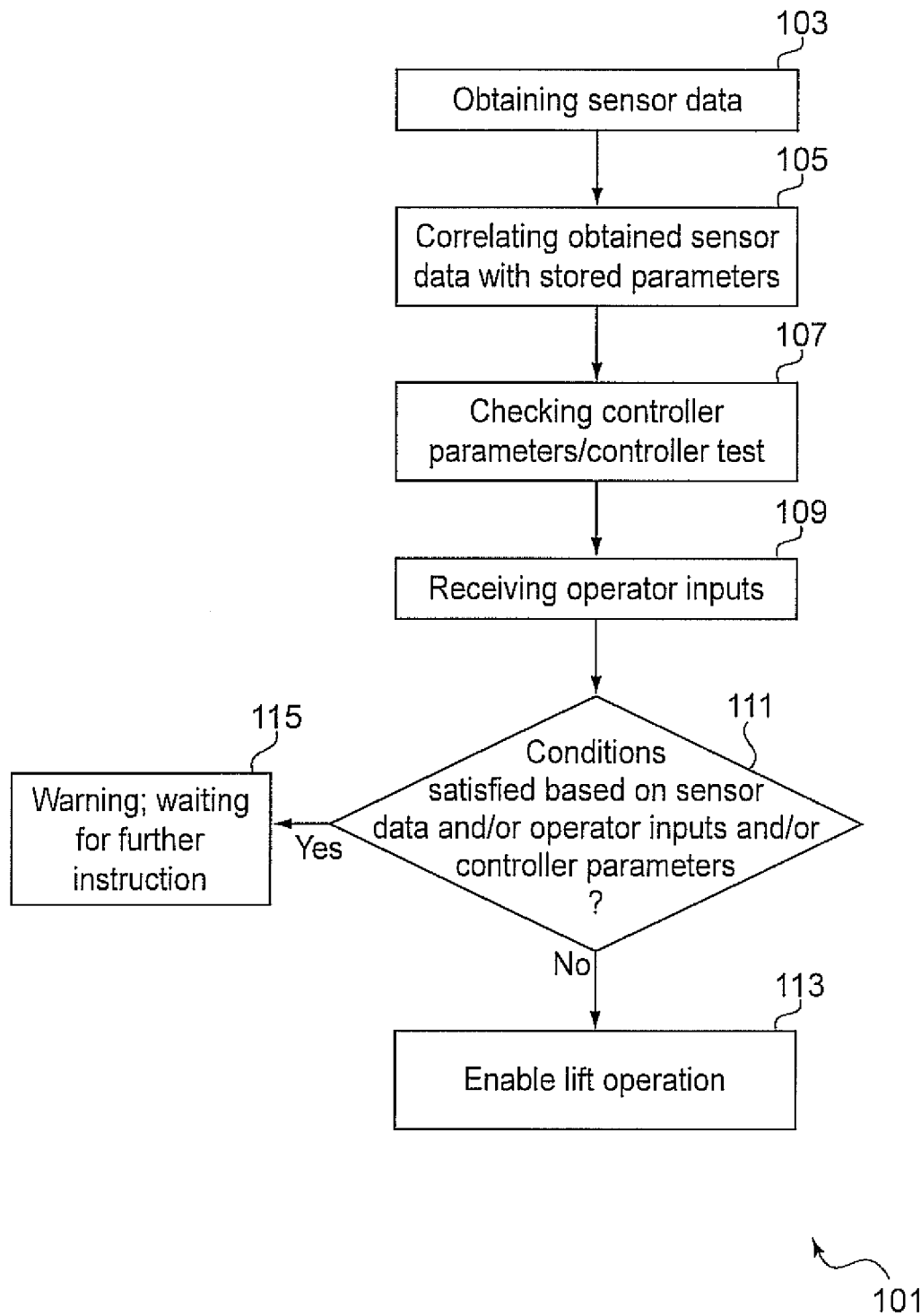
FIG. 12A is a flowchart of a method for operating the lift as controlled by the controller according to an embodiment of the invention.

FIG. 12A shows a flowchart of a method 101 for operating the lift as controlled by the controller 32 (FIG. 5), according to an embodiment of the invention. After powering on the controller, in step 103, sensor data is obtained by the controller 32. This data may include, for example, power supply voltages, electric current, cycle of the operation of the lift, and load on the lift, GPS location, temperature, pressure, the time of the year (e.g., season), etc. In step 105, the obtained sensor data is correlated/compared with parameters pre-stored in memory 32b of the controller 32 as shown in FIG. 5.

As an aside, it is to be understood that the parameters in memory 32b do not necessarily need to be "pre-stored" and could be provided by the central station to the controller as the vehicle reaches its destination, or could be provided in real time depending on the communication network and the geographic location of the vehicle. This is particularly useful as the central station can upload programmable information to the controller of the lift gate system to correct a problem on the lift in substantially real time. For example, if the particular load on the lift is slightly higher than the lift rating, it is possible that the sensors will not allow the lift to be operated. However, if the central station instructs the controller to increase the hydraulic fluid pressure sensor levels to allow for the increased load, the lift can handle the increased load and continue to function normally. However, at no time will the vehicle operator be able to program or alter the parameters used by the controller.

In step 107, parameters for the controller 32 itself are checked, and the controller 32 is tested to make sure that the controller is within its operational limits. These tests/parameters may include, for example, self-diagnostic logic test, operating current and voltage, etc. In step 109, inputs are received by the controller 32 from an operator. In step 111, a determination is made whether the required conditions are satisfied. The determination may include, for example, comparing the operator input sequence with the stored sequence to determine whether the input sequence is correct, and/or both the lift and the controller are within their respective operation limits. If the conditions are satisfied as determined in step 111, in step 113, the operation of the lift is enabled. If one or more of the conditions are not satisfied, a warning or error message may be provided to the operator in step 115, and the controller further awaits instructions without enabling the motion of the lift.

In accordance with a preferred implementation, the obtained sensor data is wirelessly sent to the central station by the controller 32 where the correlation/comparison is performed (i.e., the data is diagnosed and analyzed by the central station 31b), and the determinations made at step 111 are made based on data received by the controller 32 from the central station 31b.

Figure 12B:
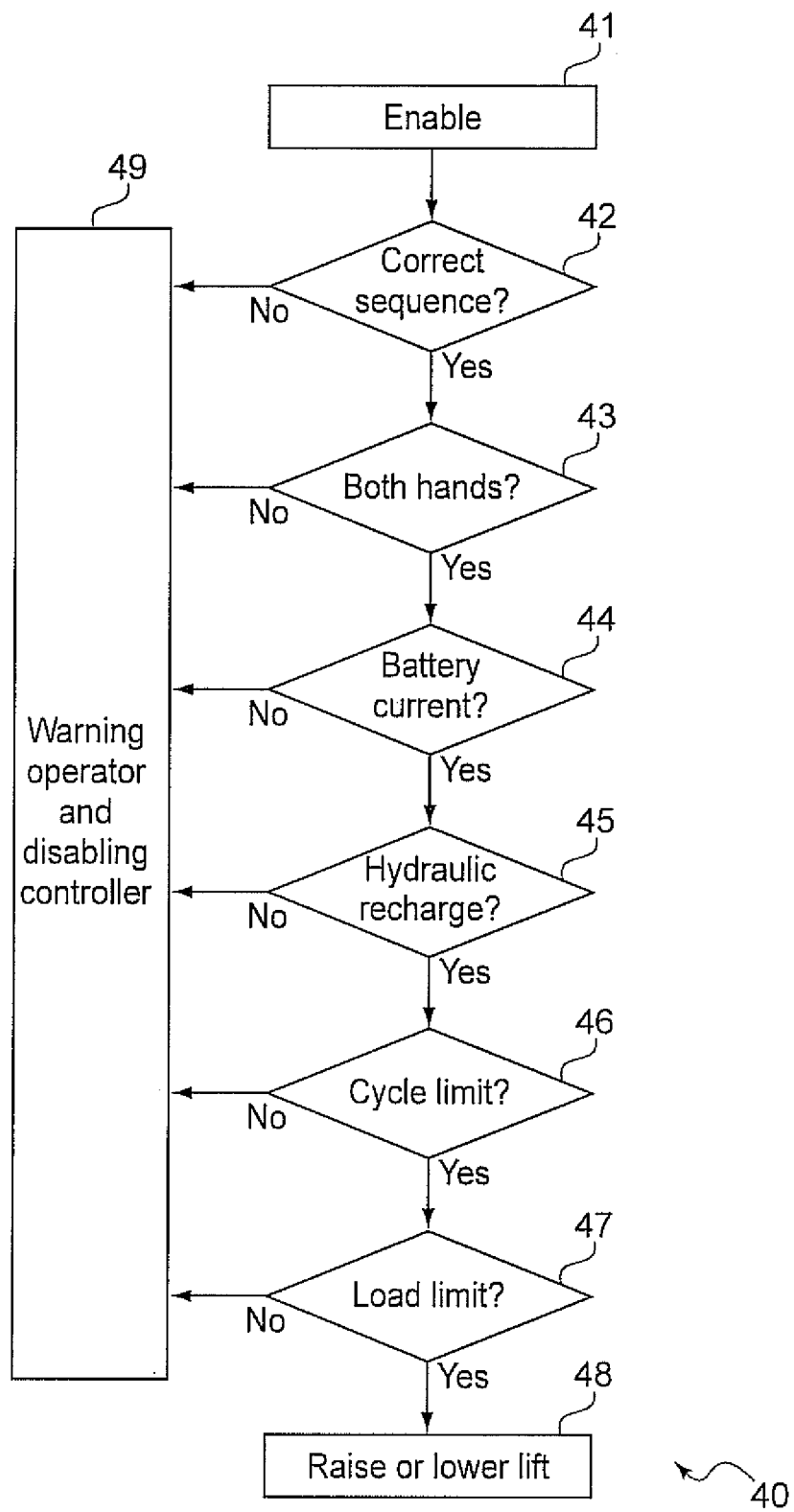
FIG. 12B is a flowchart showing more details of operation of the lift in accordance with an embodiment of the invention.

FIG. 12B shows an exemplary flowchart in more detail of a method 40 for operating the lift as controlled by the controller 32 (FIG. 5), according to an embodiment of the present invention. In step 41, a predetermined sequence of inputs is applied to the switch panel 10a by an operator. In step 42, the logic circuit 32a determines whether the input sequence is correct by comparing the input sequence with a sequence stored in memory 32b of the controller 32 as shown in FIG. 5. If yes, then before a motion of the lift can be enabled, certain conditions and/or lift states are checked. For example, in step 43 it is checked whether the operator is using both hands; in step 44 it is checked if the lift battery voltage and the current amplitude are in range; in step 45 it is checked if the hydraulic system has recharged; in step 46, it is checked if the lift has reached a cycle limit; in step 47 it is checked if a load limit for the lift is reached, etc. In this example, if all of the conditions are met, then in step 48 the motion of the lift according to the operator input commands is allowed (enabled). Otherwise, in step 49 the operator is warned and the lift is disabled (e.g., controller 32 notifies the operator by illuminating one or more LEDs 14a-14d or by indicating signals from the LCD display 15 on the switch panel 10a; subsequently, the controller 32 may be automatically disabled). Other examples are possible wherein less than all of the above example conditions need to be satisfied to enable operations of the lift. Yet in other examples, one or more other conditions may need to be satisfied in order to enable operation of the lift.

As demonstrated by the description above of the example shown in FIG. 12B, the controller of the present invention provides several safety features to the lift operation that were previously not possible. For example, through the use of the sensors and controller, the movement of the vehicle can be disabled or enabled based on the position of the lift; the path of movement of the lift can be monitored (e.g., using IR sensors) and operation of the same, and/or the vehicle can be controlled. In addition, the controller may allow for the sensing of maintenance conditions in the sense that the controller may indicate to the central station that the motor has been disconnected from the system, or any other part on the system has been disconnected and/or replace. In this respect, the parts of the lift gate system can be coded, such that the replacement of the part with a non-coded or improperly coded part could result in an error/warning message, and/or disabling of the lift by the central station.

Figure 13A:
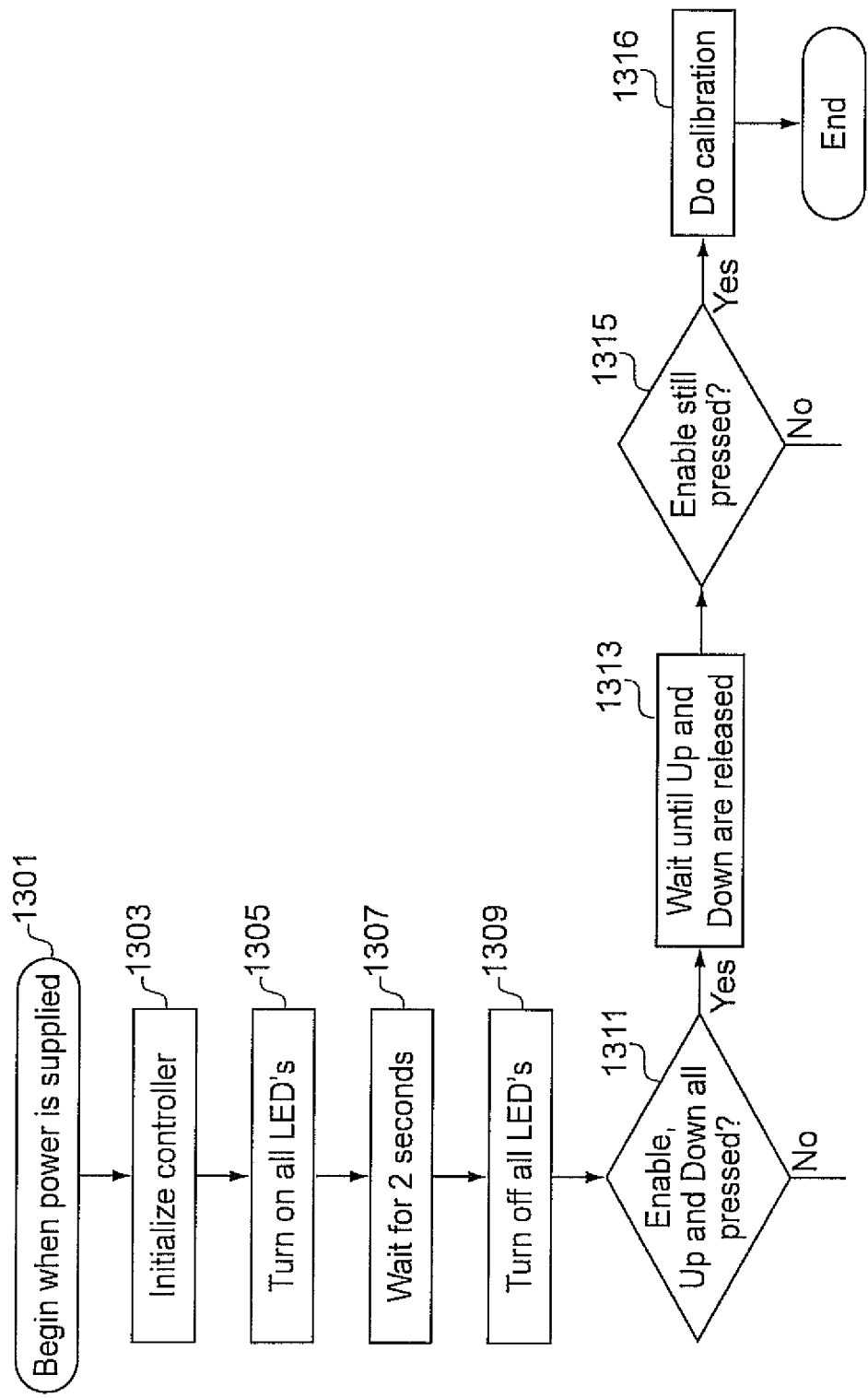
FIGS. 13A-13D show a flowchart of more detailed operation procedures.
Figure 13B:
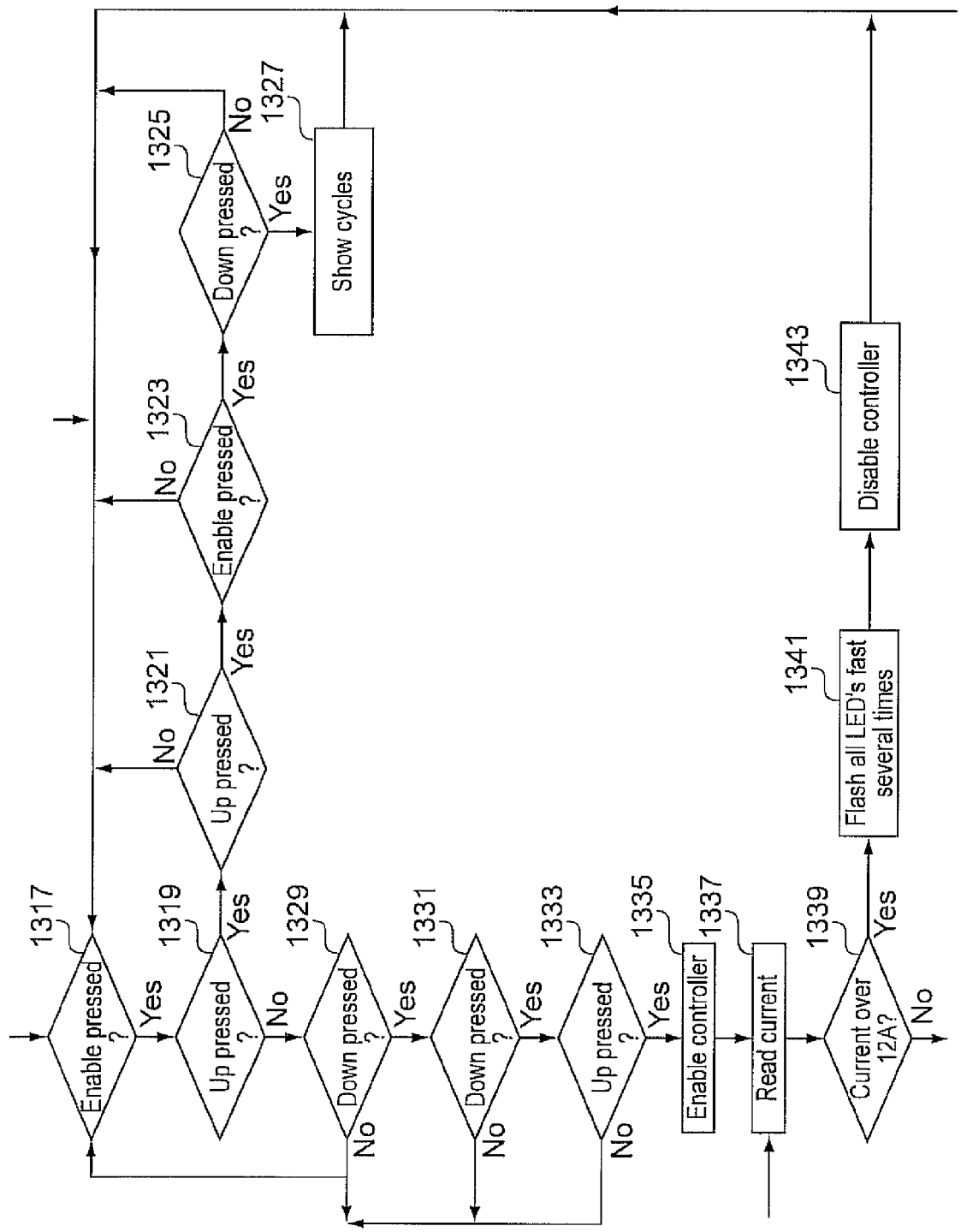
Figure 13C:
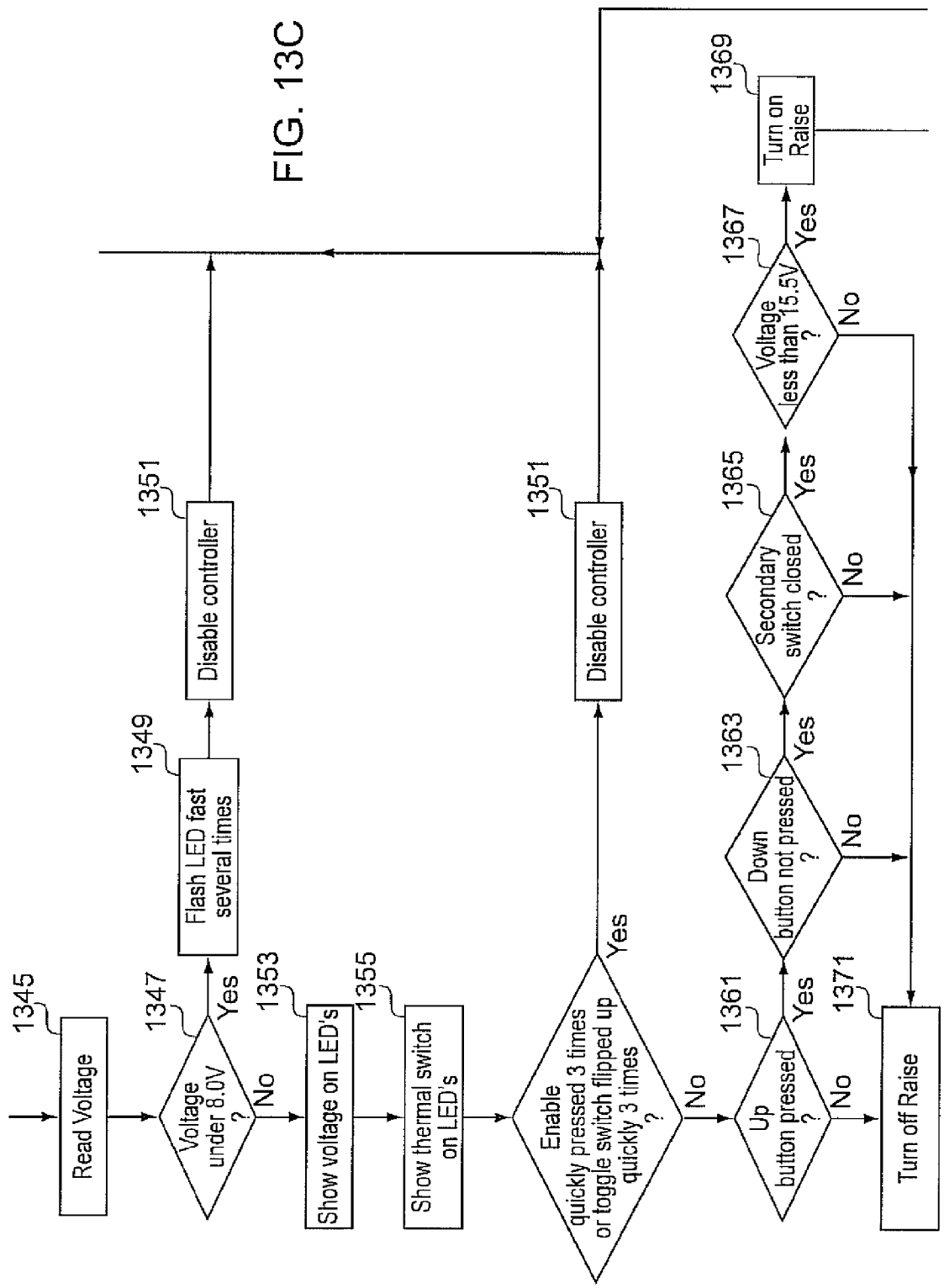
Figure 13D:
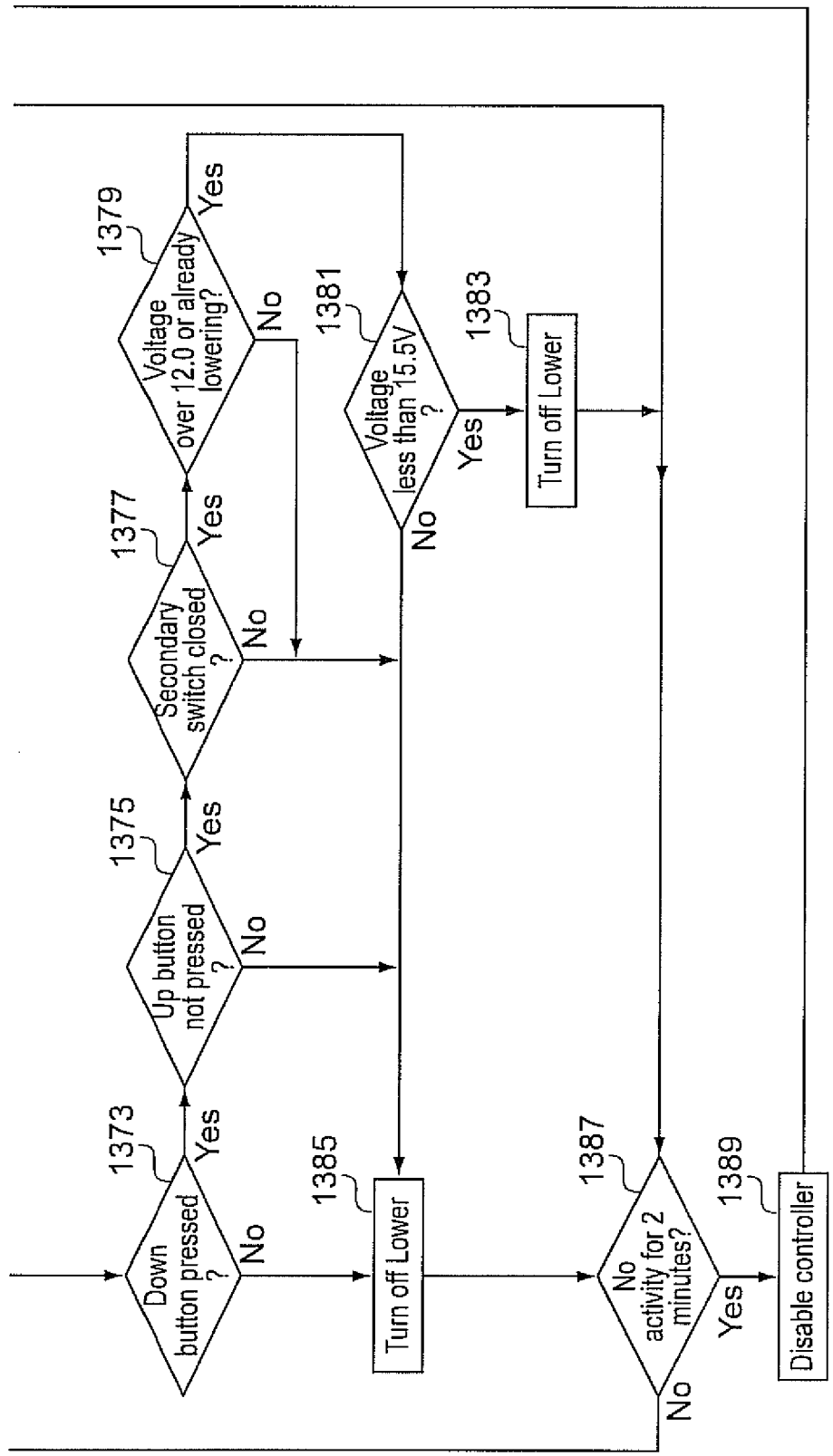

FIGS. 13A-13D provide further details of an exemplary operation of the lift as controlled by the controller 32. In particular, an exemplary input sequence for enabling the operation of the lift is shown in FIG. 13B as steps 1317-1335. In addition, an exemplary input sequence required for the controller to show a cycle count is shown in FIG. 13B as steps 1319-1327. An exemplary input sequence for raising the lift is shown in FIG. 13C as steps 1361-1369, and an exemplary input sequence for lowering the lift is shown in FIG. 13D as steps 1373-1383.

As shown in FIG. 13A, in step 1301, power is supplied to the controller 32 as the "ENABLE" button is pressed. In step 1303, controller 32 is initialized. All LEDs are turned on in step 1305. A predetermined wait time, e.g., 2 seconds, may be executed in step 1307. Following the wait time, all LEDs are turned off in step 1309.

In step 1311, controller 32 checks whether ENABLE, UP, and DOWN buttons are all pressed. If so, in step 1313, controller 32 waits for the UP and DOWN buttons to be released. In step 1315, controller 32 checks whether the ENABLE button is still pressed. If so, in step 1316, a calibration step is performed according to a calibration routine. The calibration routine computes gain coefficients that are stored in memory 32b of the controller 32 as shown in FIG. 5. The gain coefficients are used to correct the readings on the Analog-to-Digital Converters (ADC; shown as connections to microcontroller 50 in FIG. 6) such that the microcontroller 50 will correctly interpret the voltages.

As shown in FIG. 13B, in step 1317 if the ENABLE button is pressed, and if the UP button is pressed as checked in step 1319, the UP button is pressed again as checked in step 1321, the ENABLE button is pressed as checked in step 1323, the DOWN button is pressed as checked in step 1325, then the number of operation cycles of the lift is displayed or transmitted in step 1327.

If, on the other hand, the UP button is not pressed in step 1319, the controller 32 checks whether the ENABLE, DOWN, DOWN, and UP sequence is executed in steps 1329-1333. If so, the controller 32 is enabled to operate the lift in step 1335.

If the ENABLE button is released during any of these operation steps, the command sequence is deemed incorrect, and a warning message may be given to the operator.

In step 1337, a current draw on the lift is read. If the current is over, e.g., 12A as checked in step 1339, all LEDs are flashed fast for several times in step 1341. The controller 32 is subsequently disabled in step 1343.

As shown in FIG. 13C, in step 1345, a voltage of the power supply is read. If the voltage is below, e.g., 8.0 V as determined in step 1347, the ⅓ LED flashes fast several times in step 1349, and the controller 32 is subsequently disabled in step 1351.

If the voltage is above 8.0 V, the voltage may be shown in step 1353 by the LEDs 14a-14d or by the LCD display 15 as shown in FIG. 2A. In step 1355, the temperature status of the lift is shown by the THERM LED.

In step 1357, controller 32 checks whether the ENABLE button is pressed quickly three times, or whether a toggle switch, if equipped, is flipped up quickly three times. If so, the controller is disabled in step 1359.

In step 1361 if the UP button is pressed, and in step 1363 if the DOWN button is not pressed, and in step 1365 if the secondary switch 19 is closed, and in 1367 if the voltage is less than 15.5 V, the "raise" function of the lift 33 is turned on in step 1369. Otherwise, the raise function is turned off in step 1371.

As shown in FIG. 13D, if the DOWN button is pressed in step 1373, and if the UP button is not pressed in step 1375, and if the secondary switch 19 is closed in step 1377, while the voltage is over 12.0 V as determined in step 1379 but less than 15.5 V as determined in step 1381, the "lower" function of the lift 33 is turned on in step 1385. Otherwise, the "lower" function of the lift 33 is turned off in step 1385.

If there is no activity for over, e.g., two minutes as determined in step 1387, the controller 32 is again disabled in step 1389.

Those of ordinary skill in the art will recognize that, the steps shown in FIGS. 12 and 13A-13D are not necessarily executed sequentially as shown. Rather, the steps can be parallel. In addition, more or fewer steps may be needed to achieve a smooth operation of the lift.

As is known to those skilled in the art, the exemplary system and method described above, according to the present invention, can be implemented in many ways. For example, different command sequences can be designed and programmed. In addition, different combinations of illuminating LEDs can be used to display lift status or other signals to the operator. Moreover, although flat-panel switches and a switch/handle assembly are shown by way of examples, the controller of the invention can be used with other types of switches. For example, a toggle switch can also take advantage of the controller of the invention.

When using a toggle switch, the switching sequences may need to be modified to accommodate the toggle switch. For example, holding a toggle switch to the UP position for five (5) seconds enables the controller. Quickly switch to the UP position for three times disables the controller. Holding UP for 10 seconds shows the cycle count of the lift.

The table shown in FIGS. 14A-14H is an example of the various different parameters that can be monitored and/or sensed and the various analyses that can be performed on such data in order to provide ongoing service and maintenance. This table shows the particular parameter being monitored or sensed, and the range and preferred range for the respective parameter. In addition, this table shows the reasons for monitoring or measuring the particular parameter and the various analyses that can be performed on the monitored/sensed and/or measured data.

Advantageously, the lift controller and control system in accordance with embodiments of the invention provide an intelligent user interface to control a lift, allowing for more logic modes of operating the lift to be controlled.

In some applications, it is desirable to configure the liftgate so that it folds away when not in use. Examples of such designs are the unitary cantilever Tuk-A-Way® liftgates.

The present invention has been described in considerable detail with reference to certain preferred versions thereof however, other versions are possible. Therefore, the spirit and scope of the appended claims should not be limited to the description of the preferred versions contained herein.

What is claimed is:

1. A control system for a lift gate system, the control system comprising:

a field subsystem disposed on a vehicle having the lift gate system, the field subsystem having a controller and a communication module, wherein the presence of the field subsystem on a vehicle is indicative of the presence of a lift gate system on that vehicle;

a customer remotely located station in wireless communication with the communication module of the field subsystem; and a manufacturer remotely located station in wireless communication with the communication module of the field subsystem;

wherein said communication module is configured to wirelessly communicate only data relating to operation of the lift gate system to both the customer and the manufacturer remotely located stations, the data relating to the operation of the lift gate system further comprising at least one input and at least one sensed condition relating to operation of the lift gate system, the at least one sensed condition relating to operation of the lift gate comprising at least one of:

a lift state; a motion of the lift; a load applied to the lift; a lift temperature; a hydraulic fluid pressure; a delay time for pump activation; an operator safety condition; and a number of cycles of operation of the lift, wherein the operator safety condition comprises at least one of:

whether the operator of the lift is using both hands for inputting a command to the controller;
whether the vehicle is properly parked;
whether the operator is off a deck of the lift;
whether the operator is clear of a projected motion path of the lift:
whether a lift platform is down; and
whether a projected path of motion of the lift platform is clear, the customer or manufacturer remotely located station being configured to wirelessly communicate a condition or input data satisfaction or non-satisfaction notification to the field subsystem in response to received operation data.

2. The control system according to claim 1, wherein the communication module and the customer remotely located station are configured to operate on a secure wireless network.

3. The control system according to claim 1, wherein the communication module and the customer remotely located station are configured to operate on a WiFi network.

4. The control system according to claim 1, wherein the communication module and the customer remotely located station are configured to operate on a wireless network said wireless network comprising at least one of Bluetooth, Radio Frequency and Infrared.

5. The control system according to claim 1, wherein the condition or input data non-satisfaction notification comprises a warning/error message sent wirelessly to a lift operator via the communication module.

6. The control system according to claim 1, wherein the wireless communication of the condition or input data non-satisfaction notification subsystems comprises a warning/error message sent wirelessly from the controller to the customer and manufacturer remotely located stations.

7. The control system according to claim 1, further comprising a geographic positioning sensor (GPS) device disposed on the vehicle having the lift gate system and providing GPS conditions to the controller.

8. The control system according to claim 7, wherein the condition or input data non-satisfaction notification comprises a warning/error message based on sensed GPS conditions.

9. The control system according to claim 1, wherein the controller is configured to restrict movement of the lift based on one or more of the sensed safety conditions.

10. The control system according to claim 1, wherein the control system further comprises memory for storing the sensed conditions, said stored sensed conditions being retained in said memory until said customer remotely located station authorizes removal of the same from the memory.

11. The control system according to claim 1, wherein the control system further comprises a communication jack for wired connection of the controller to the customer remote station or a customer.

12. A method for controlling the operation of one or more lift gates disposed on one or more vehicles in a fleet, the method comprising the steps of:
sensing at least one operating condition relating to the operation of the lift gate system, said sensing at least one operating condition of the lift gate, further comprises sensing at least one of: a lift state; a motion of the lift; a load applied to the lift; a lift temperature; a hydraulic fluid pressure; a wait time for recharging a hydraulic pump; an operator safety condition; and a maintenance condition, wherein the sensing of an operator safety condition comprises sensing at least one of whether the operator is using both hands for inputting a command to the lift controller, whether the vehicle is properly parked, whether the operator is off a deck of the lift, and whether the operator is clear of a projected motion of the lift
wirelessly transmitting from a lift controller the sensed at least one operating condition to a customer located remote station and a manufacturer located remote station; and
wirelessly transmitting from the manufacturer located remote station to the lift controller a satisfaction or a non-satisfaction indication based on the sensed at least one operating condition.

13. The method according to claim 12, wherein said steps of wirelessly transmitting are performed over a wireless network.

14. The method according to claim 12, wherein sensing of a lift state further comprises sensing whether the lift is fully extended, partially extended or in a completely stowed position.

15. The method according to claim 12 wherein the sensing further comprises receiving input data from an operator via the lift controller, wherein the step of wirelessly transmitting from the lift controller to the customer located remote station includes the wireless transmission of said received input data, and wherein said step of wirelessly transmitting from the manufacturer located remote station a satisfaction or non-satisfaction indication to the lift controller is further based on the received input data.

16. The method according to claim 12, wherein the sensing of a maintenance condition comprises verifying authenticity of components of the lift system.

17. The method according to claim 12, further comprising:
wirelessly transmitting, to the lift controller from the customer located remote station, commands to change the operation of the lift in response to the sensed at least one condition.

18. A method for controlling the operation of one or more lift gates disposed on one or more vehicles in a fleet, the method comprising the steps of:
sensing an operator safety condition relating to the operation of the lift gate system, the sensed operator safety condition comprising at least one of whether the operator is using both hands for inputting a command to the lift controller, whether the vehicle is properly parked, whether the operator is off a deck of the lift, and whether the operator is clear of a projected motion of the lift;
wirelessly transmitting from a lift controller the sensed operator safety condition to a customer located remote station and a manufacturer located remote station; and
wirelessly transmitting from the manufacturer located remote station to the lift controller a satisfaction or a non-satisfaction indication based on the sensed operator safety condition.

19. A method for controlling the operation of one or more lift gates disposed on one or more vehicles in a fleet, the method comprising the steps of:
sensing at least one operating condition relating to the operation of the lift gate system, said at least one operating condition of the lift gate comprising at least one of: a lift state; a motion of the lift; a load applied to the lift; a lift temperature; a hydraulic fluid pressure; a wait time for recharging a hydraulic pump; an operator safety condition; and a maintenance condition; the maintenance condition including a verification of authenticity of components of the lift gate system;
wirelessly transmitting from a lift controller the sensed at least one operating condition to a customer located remote station and a manufacturer located remote station; and
wirelessly transmitting from the manufacturer located remote station to the lift controller a satisfaction or a non-satisfaction indication based on the sensed at least one operating condition.

\* \* \* \* \*